United States Patent
Okamoto

(10) Patent No.: US 9,823,957 B2
(45) Date of Patent: Nov. 21, 2017

(54) PROCESSOR SYSTEM, ENGINE CONTROL SYSTEM AND CONTROL METHOD

(71) Applicant: Renesas Electronics Corporation, Kawasaki-shi, Kanagawa (JP)

(72) Inventor: Tatsushi Okamoto, Kanagawa (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 26 days.

(21) Appl. No.: 14/804,970

(22) Filed: Jul. 21, 2015

(65) Prior Publication Data
US 2016/0055047 A1 Feb. 25, 2016

(30) Foreign Application Priority Data
Aug. 19, 2014 (JP) ................. 2014-166615

(51) Int. Cl.
*G06F 11/07* (2006.01)
*G06F 11/16* (2006.01)
*G06F 11/22* (2006.01)

(52) U.S. Cl.
CPC ........ *G06F 11/079* (2013.01); *G06F 11/0724* (2013.01); *G06F 11/16* (2013.01);
(Continued)

(58) Field of Classification Search
CPC ............. G06F 11/0724; G06F 11/1645; G06F 9/3877; G06F 9/3885
(Continued)

(56) References Cited

U.S. PATENT DOCUMENTS 7,243,212 B1 * 7/2007 Purcell ................ G06F 9/30101
712/32
8,010,846 B1 * 8/2011 Birkedahl ............. G06F 9/4881
714/11
(Continued)

FOREIGN PATENT DOCUMENTS

EP 2 722 760 A1 4/2014
GB 2425380 A * 10/2006 ........... G06F 9/5044
(Continued)

OTHER PUBLICATIONS

Extended European Search Report issued Aug. 5, 2016, in European Patent Application No. EP15175642.6.

*Primary Examiner* — Chae Ko
(74) *Attorney, Agent, or Firm* — Shapiro, Gabor and Rosenberger, PLLC

(57) ABSTRACT

A processor system includes a master processor that successively processes a plurality of tasks, a checker processor that successively processes at least one of the plurality of tasks, and a control circuit that performs control so that the checker processor operates when the master processor and the checker processor perform a lock-step operation, and the checker processor stops its operation when the master processor and the checker processor do not perform the lock-step operation, the lock-step operation being an operation in which each of the master and checker processors processes the same task, in which the control circuit performs control so that a period from when a task is processed by the lock-step operation to when another task is processed in the next lock-step operation is equal to or shorter than a maximum test period, the maximum test period being a test period acceptable to the processor system.

23 Claims, 19 Drawing Sheets

(52) U.S. Cl.
CPC ...... G06F 11/1641 (2013.01); G06F 11/1687 (2013.01); G06F 11/22 (2013.01); *G06F 2201/845* (2013.01)

(58) Field of Classification Search
USPC .......................................................... 714/11
See application file for complete search history.

(56) References Cited

U.S. PATENT DOCUMENTS

| | | | |
|---|---|---|---|
| 8,458,516 B2 | 6/2013 | Matsuyama | |
| 2006/0190702 A1* | 8/2006 | Harter | G06F 11/10 712/15 |
| 2006/0245264 A1* | 11/2006 | Barr | G06F 9/5044 365/189.08 |
| 2009/0044058 A1* | 2/2009 | Choate | G06F 11/2236 714/40 |
| 2010/0056278 A1* | 3/2010 | Mattice | G07F 17/32 463/42 |
| 2010/0218022 A1* | 8/2010 | Matsuyama | G06F 9/30189 713/323 |
| 2010/0262811 A1* | 10/2010 | Moyer | G06F 11/1679 712/227 |
| 2010/0287421 A1* | 11/2010 | Golowner | G05B 9/03 714/55 |
| 2012/0304024 A1* | 11/2012 | Rohleder | G06F 9/28 714/49 |
| 2013/0007513 A1* | 1/2013 | Traskov | G06F 11/165 714/10 |
| 2016/0154751 A1* | 6/2016 | Singh | G06F 9/52 710/267 |

FOREIGN PATENT DOCUMENTS

| | | |
|---|---|---|
| JP | 2008-217051 A | 9/2008 |
| JP | 2010-198131 A | 9/2010 |
| WO | WO 2007/006013 A2 | 1/2007 |

* cited by examiner

PROCESSOR SYSTEM, ENGINE CONTROL SYSTEM AND CONTROL METHOD

CROSS-REFERENCE TO RELATED APPLICATIONS

This application is based upon and claims the benefit of priority from Japanese patent application No. 2014-166615, filed on Aug. 19, 2014, the disclosure of which is incorporated herein in its entirety by reference.

BACKGROUND

The present invention relates to a processor system, an engine control system and a control method, and in particular to a processor system, an engine control system and a control method in which a lock-step operation or the like is performed.

In recent years, ISO26262 of the International Standards Organization has been receiving attention as functional safety standards for vehicle-mounted electronic devices and the like. The functional safety means to secure at least acceptable minimum safety even when a fault (or a failure, hereinafter called "fault") occurs in a component of a vehicle-mounted electronic device such as a microcomputer (e.g., a MCU: Micro Control Unit) by making functional contrivance. For example, when a fault occurs, it is necessary to detect that fault within a predetermined period after the occurrence of that fault.

As an example of the functional contrivance, there is a lock-step method using a plurality of processor cores. As a related technique, Japanese Unexamined Patent Application Publication No. 2010-198131 (hereinafter referred to as "Patent Literature 1") discloses a technique related to a processor system using a lock-step method. In the lock-step method, the same process (task) is performed in a plurality of processor cores and a fault (an error) is detected by comparing execution results of these processor cores with each other.

In the lock-step method, in general, since a plurality of processor cores operate simultaneously, the current consumption in the microcomputer increases. Therefore, there is a problem that the amount of generated heat (hereinafter called "heat generation amount") increases in a microcomputer using a lock-step method. It should be noted that Japanese Unexamined Patent Application Publication No. 2008-217051 (hereinafter referred to as "Patent Literature 2") discloses a technique related to a lock-step method in which the heat generation amount is reduced.

SUMMARY

The present inventors have found the following problem. As described above, even if a fault occurs, a microcomputer used in a vehicle-mounted system or the like needs to detect that fault within a predetermined period after the occurrence of that fault. Meanwhile, in Patent Literature 2, one of two processors is stopped and restarted according to the temperature of the processors. However, in this configuration, there is a possibility that when only one processor is operating, a fault that occurs in that processor cannot be detected. Further, in Patent Literature 1, there is a possibility that when a lock-step method is performed, the heat generation amount in the processor system increases.

Other problems and novel features will be more apparent from the following descriptions in this specification and the accompanying drawings.

A first aspect of the present invention is a processor system including: a master processor that successively processes a plurality of tasks; a checker processor that successively processes at least one of the plurality of tasks; and a control circuit that performs control so that the checker processor operates when the master processor and the checker processor perform a lock-step operation, and the checker processor stops its operation when the master processor and the checker processor do not perform the lock-step operation, the lock-step operation being an operation in which each of the master processor and the checker processor processes the same task, in which the control circuit performs control so that a period from when a task is processed by the lock-step operation to when another task is processed in the next lock-step operation is equal to or shorter than a maximum test period that is predetermined, the maximum test period being a test period acceptable to the processor system.

Note that those that express the above-described apparatus according to the embodiment as a method or a system, programs that cause a computer to implement the above-described apparatus or a part of the above-described apparatus, image-pickup apparatuses including the above-described apparatus are also regarded as embodiments according to the present invention.

According to the above-described aspect, it is possible to detect a fault within a predetermined period while reducing the heat generation amount.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
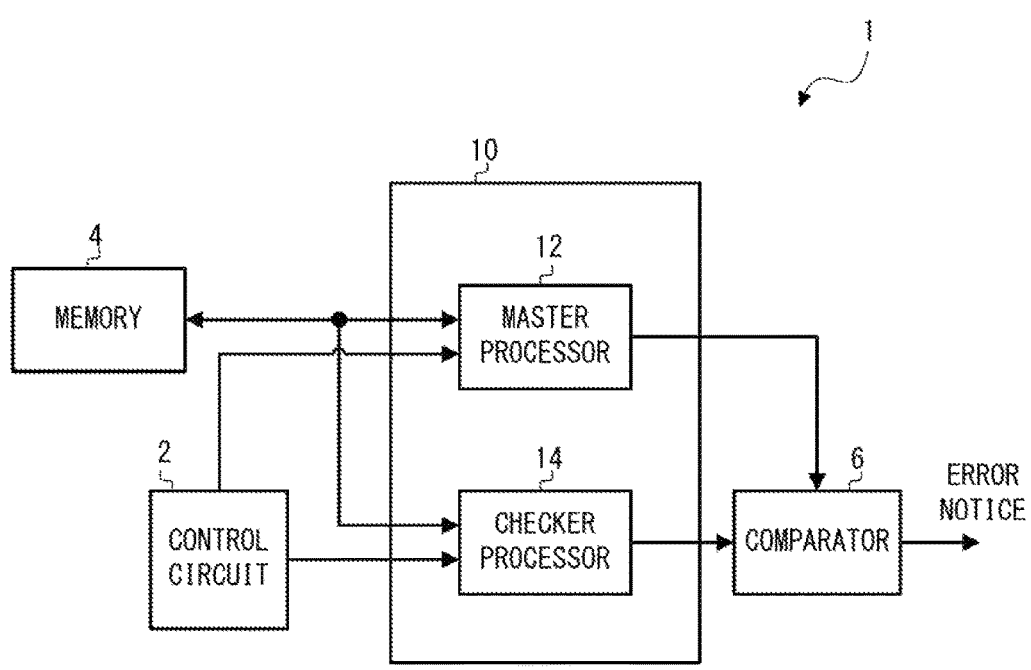
FIG. 1 shows an outline of a processor system according to an embodiment.

Embodiments are hereinafter explained with reference to the drawings. For clarifying the explanation, the following descriptions and the drawings may be partially omitted and simplified as appropriate. Further, each of the elements that are shown in the drawings as functional blocks for performing various processes can be implemented by hardware such as a CPU (Central Processing Unit), a memory, and other types of circuits, or implemented by software such as a program loaded in a memory. Therefore, those skilled in the art will understand that these functional blocks can be implemented solely by hardware, solely by software, or a combination thereof. That is, they are limited to neither hardware nor software. Note that the same symbols are assigned to the same components throughout the drawings and duplicated explanations are omitted as required.

The above-described program can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

Outline of Embodiment

Prior to explanations of embodiments, an outline of an embodiment is explained. FIG. 1 shows an outline of a processor system 1 according to an embodiment. As shown in FIG. 1, the processor system 1 includes a control circuit 2, a memory 4, a comparator 6, and a processor unit 10. The processor unit 10 includes a master processor 12 and a checker processor 14. Note that the circuit configuration (hardware configuration) of the checker processor 14 may be identical to that of the master processor 12. Further, as described later, the master processor 12 and the checker processor 14 function as first and second processors capable of processing a plurality of tasks in a lock-step method. Note that the master processor 12 and the checker processor 14 may serve as the first and second processors, respectively, or may serve as the second and first processors, respectively.

The processor system 1 may be, for example, a microcomputer chip that controls a motor (such as an engine) of a vehicle such as a car. However, the processor system 1 is not limited to such microcomputer chips. That is, the processor system 1 controls a system to be controlled such as a motor of a vehicle. For example, the processor system 1 may be an engine control system that controls an engine. The processor system 1, which includes the above-described components, performs a lock-step operation in a predetermined situation. The lock-step operation means an operation in which each of the master processor 12 and the checker processor 14 process the same task. Note that the memory 4 and the comparator 6 do not necessarily have to be provided in the processor system 1. That is, the memory 4 and the comparator 6 may be disposed outside the processor system 1.

The memory 4 stores a plurality of tasks (data) that the processor unit 10 should process, such as engine control tasks for controlling the engine. The processor unit 10 reads (fetches) a task stored in the memory 4 and processes the read task. The master processor 12 successively processes a plurality of read (fetched) tasks. Meanwhile, the checker processor 14 processes the same tasks as those processed by the master processor 12 when the processor system performs a lock-step operation under the control of the control circuit 2. When a lock-step operation is performed, the comparator 6 compares a processing result of the master processor 12 (master processing result) with a processing result of the checker processor 14 (checker processing result). Then, when the master processing result is different from the checker processing result, the comparator 6 issues an error notice.

The task processed by the checker processor 14 is the same as that processed by the master processor 12. Therefore, under normal conditions, the checker processing result is identical to the master processing result. However, when the master processor (or the checker processor 14) malfunctions, the checker processing result is different from the master processing result. Therefore, when the master processing result is different from the checker processing result as they are compared by the comparator 6, it means that the occurrence of a fault (an error) in the processor unit 10 is detected. That is, the lock-step operation functions as a test process for detecting a fault in the master processor (or the checker processor 14).

The control circuit 2 (control unit) determines whether a lock-step operation should be performed or not. In other words, the control circuit 2 enables or disables the lock-step method. When a lock-step operation is performed (when the lock-step method is enabled), the control circuit 2 makes the checker processor 14 operate. On the other hand, when a lock-step operation is not performed (when the lock-step method is disabled), the control circuit 2 stops the checker processor 14. Note that the control circuit 2 performs control so that a period from when a task is processed by a lock-step operation to when another task is processed in the next lock-step operation is equal to or shorter than a maximum proof test period (maximum test period). That is, the control circuit 2 enables the lock-step method at predetermined timings so that an interval between a first lock-step process and a second lock-step process subsequent to the first lock-step process is equal to or shorter than the maximum proof test period.

This maximum proof test period is a proof test period (test period) for which an acceptable value is determined for each system. Further, the proof test means a function checking test that is carried out for checking whether functions of the processor system 1 are properly performed or not. Further, the proof test period (PTP) means an interval at which proof tests are carried out. Further, the maximum proof test period (PTPmax) is a maximum value for the proof test period acceptable to the system. Note that in the processor system 1 according to this embodiment, the proof test corresponds to a process for detecting a fault by performing a lock-step operation. Detailed explanations are given hereinafter.

Figure 2:
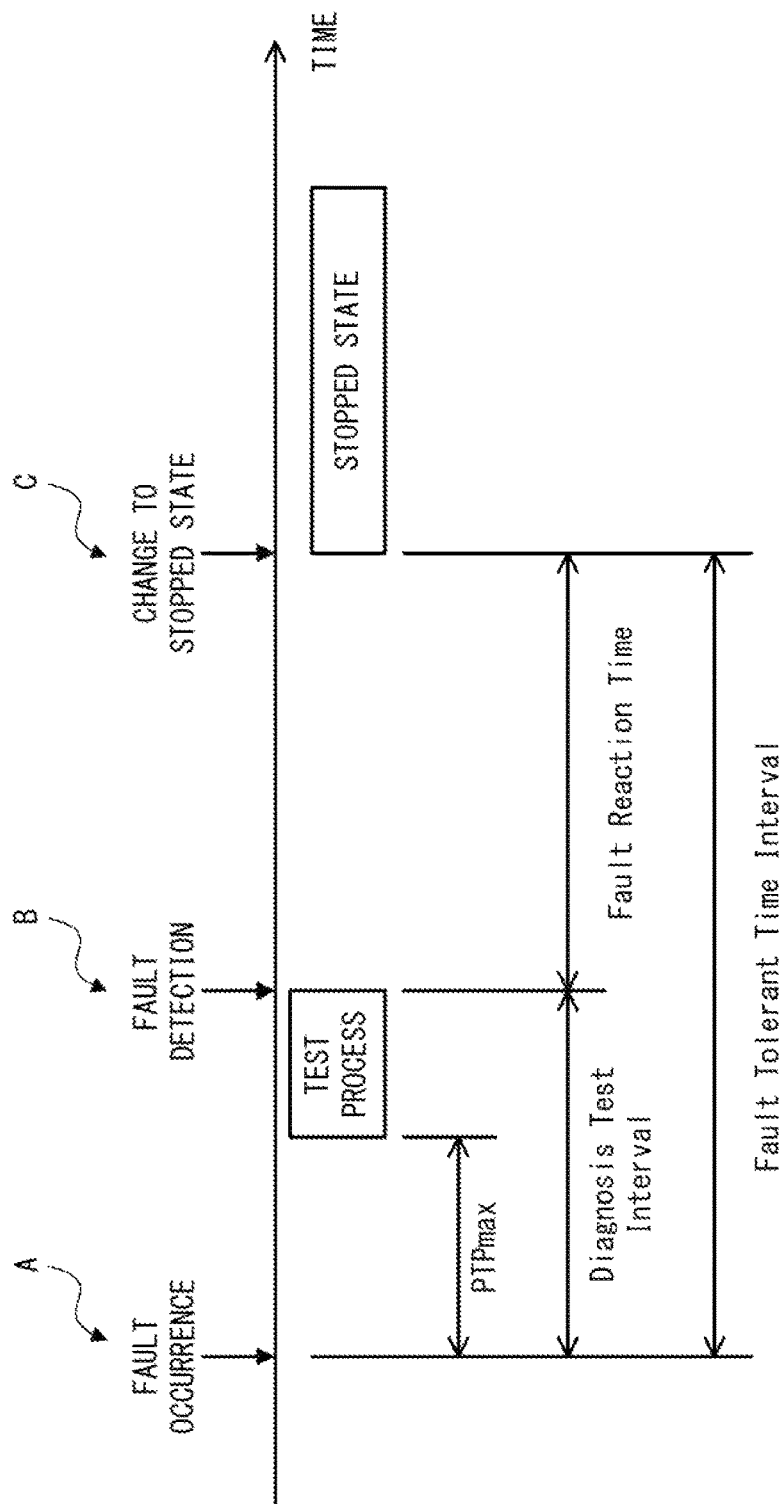
FIG. 2 is a timing chart for explaining a maximum proof test period according to an embodiment.

FIG. 2 is a timing chart for explaining a maximum proof test period according to this embodiment. As a method for functional safety, there is a method in which when a fault occurs, the system is brought into a stopped state. In the processor system 1 according to this embodiment, a fault that occurs in the processor unit 10 (master processor 12) (arrow A) is detected when a test process (lock-step operation) is performed (arrow B). Then, when the comparator 6 issues an error notice, the system to be controlled changes to a stopped state (arrow C).

The period from when a fault occurs to when the system changes to a stopped state is called "Fault Tolerant Time Interval". Further, the period from when a fault occurs to when the fault is detected is called "Diagnosis Test Interval". Further, the period from when a fault is detected to when the system changes to a stopped state is called "Fault Reaction Time". The aforementioned PTPmax means a period that is obtained by subtracting a time necessary for a test process from the diagnosis test interval.

Note that the fault reaction time (e.g., 300 ms (milliseconds)) can be determined based on the specifications, performance, and so on of the system to be controlled. Further, the fault tolerant time interval (e.g., 500 ms) can be determined by the manufacturer of the system to be controlled. Based on these values, the diagnosis test interval (e.g., 200 ms) can be obtained in advance. Further, the time necessary for the test process (e.g., 5 ms) can be determined for each processor system 1 in advance. As a result, the PTPmax (e.g., 195 ms) is determined in advance. Therefore, the PTPmax is a predetermined test period acceptable to the system to be controlled.

Assume a case where the period from when a test process is carried out to when the next test process is carried out exceeds the PTPmax. In this case, if a fault (an error) occurs immediately after the preceding test process is finished, the period from when the fault occurs to when the next test process in which the fault is detected is carried out exceeds the predetermined diagnosis test interval shown in FIG. 2. In contrast to this, in this embodiment, the control circuit 2 performs control so that the period from when a task is processed in an lock-step operation (test process) to when another task is processed in the next lock-step operation is equal to or shorter than the PTPmax. Therefore, the processor system 1 according to this embodiment can detect a fault within a predetermined period.

Further, when a lock-step operation is performed for every task, the test process is performed for every task. Therefore, a fault can be detected within a predetermined period. However, if the lock-step operation is performed at all times, both of the two processors (the master processor 12 and the checker processor 14) are always operated. This causes a possibility that the heat generation amount in the processor system 1 increases. In contrast to this, in this embodiment, the lock-step operation is not necessarily performed at all times. That is, the lock-step operation is stopped provided that the condition that the period from when a task is processed by a lock-step operation to when another task is processed in the next lock-step operation is equal to or shorter than the PTPmax is satisfied. That is, the checker processor 14 does not necessarily operate at all times. Therefore, it is possible to satisfy the functional safety specifications required of the system and reduce the heat generation amount in the processor system 1.

First Embodiment

Figure 3:
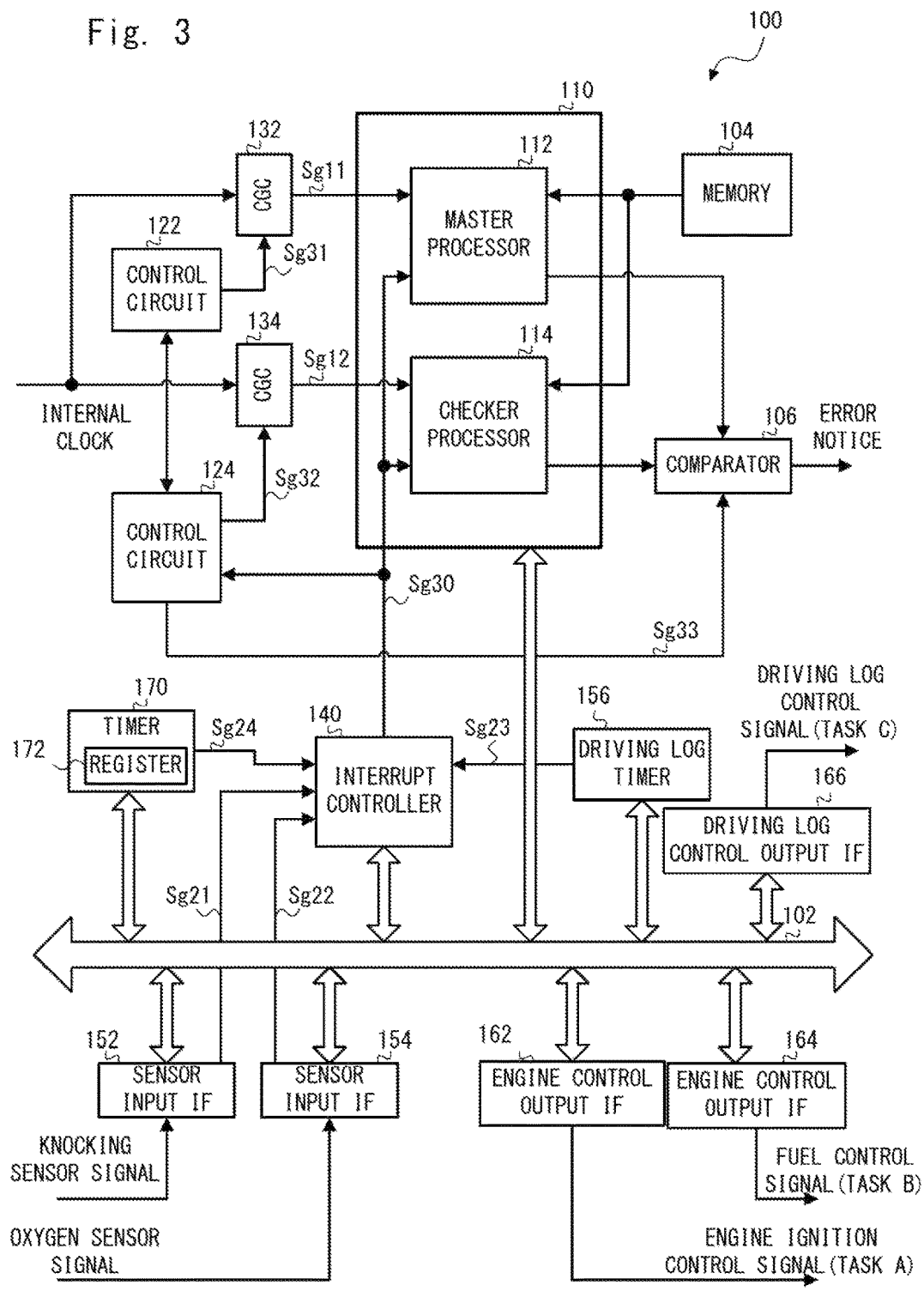
FIG. 3 shows a configuration of a processor system according to a first embodiment.

FIG. 3 shows a configuration of a processor system 100 according to a first embodiment. In the first embodiment, the system that is controlled by the processor system 100 is an engine system of a vehicle or the like. However, the system to be controlled is not limited to such engine systems. (This also holds true for other embodiments.) The processor system 100 includes a memory 104, a comparator 106, a processor unit 110, control circuits 122 and 124, and CGCs (Clock Gating Cells) 132 and 134. The processor unit 110 includes a master processor 112 and a checker processor 114.

Further, the processor system 100 includes an interrupt controller 140, sensor input interfaces (IFs) 152 and 154, a driving log timer 156, engine control output interfaces (IFs) 162 and 164, a driving log control output interface (IF) 166, and a timer 170. Each of the components provided in the processor system 100 is connected to a bus 102. That is, the components provided in the processor system 100 are connected to each other through the bus 102.

The memory 104 corresponds to the memory 4 shown in FIG. 1. The memory 104 stores a plurality of tasks (data) that the processor unit 110 should process. In the first embodiment, the memory 104 stores, for example, an engine ignition control task (task A), a fuel control task (task B), a driving log control task (task C), an idling task (task D), and a fault diagnosis task (task E). Further, at least the engine ignition control task (task A) and the fuel control task (task B) are engine control tasks.

The processor unit 110 is, for example, a lock-step CPU or the like. The processor unit 110 corresponds to the processor unit 10 shown in FIG. 1. Similarly, the master processor 112 and the checker processor 114 correspond to the master processor 12 and the checker processor 14, respectively. Note that the circuit configuration of the checker processor 114 may be identical to that of the master processor 112.

The CGC 132 receives an internal clock, and supplies a clock signal Sg11 to the master processor 112 or stops the supply of the clock signal Sg11 under the control of the control circuit 122. The CGC 134 receives an internal clock, and supplies a clock signal Sg12 to the checker processor 114 or stops the supply of the clock signal Sg12 under the control of the control circuit 124.

The control circuits 122 and 124 correspond to the control circuit 2 shown in FIG. 1. The control circuit 122 controls the CGC 132 as to whether the CGC 132 should supply the clock signal Sg11 to the master processor 112 or not. Specifically, when the clock signal Sg11 should be supplied to the master processor 112, the control circuit 122 asserts (i.e., enables (hereinafter expressed as "asserts")) a master clock enable signal Sg31 (High). On the other hand, when the clock signal Sg11 should not be supplied to the master processor 112, the control circuit 122 negates (i.e., disables (hereinafter expressed as "negates")) the master clock enable signal Sg31 (Low).

When the master clock enable signal Sg31 is asserted (i.e., enabled), the CGC 132 supplies the clock signal Sg11 to the master processor 112. As a result, the master processor 112 operates. On the other hand, when the master clock enable signal Sg31 is negated (i.e., disabled), the CGC 132 stops supplying the clock signal Sg11 to the master processor 112. As a result, the master processor 112 stops operating.

The control circuit 124 controls the CGC 134 as to whether the CGC 134 should supply the clock signal Sg12 to the checker processor 114 or not. Specifically, when the clock signal Sg12 should be supplied to the checker processor 114, the control circuit 124 asserts a checker clock enable signal Sg32. On the other hand, when the clock signal Sg12 should not be supplied to the checker processor 114, the control circuit 124 negates the checker clock enable signal Sg32.

When the checker clock enable signal Sg32 is asserted, the CGC 134 supplies the clock signal Sg12 to the checker processor 114. As a result, the checker processor 114 operates. On the other hand, when the checker clock enable signal Sg32 is negated, the CGC 134 stops supplying the clock signal Sg12 to the checker processor 114. As a result, the checker processor 114 stops operating.

The control circuit 124 (control unit) determines whether a lock-step operation should be performed or not according to an interrupt request signal Sg30 from the interrupt controller 140. In other words, the control circuit 124 determines whether to enable or disable the lock-step method. This determination whether a lock-step operation is performed or not is described later. When a lock-step operation is performed, the control circuit 124 asserts the checker clock enable signal Sg32 and thereby makes the checker processor 114 operate. On the other hand, when a lock-step operation is not performed, the control circuit 124 negates the checker clock enable signal Sg32 and thereby stops the checker processor 114. Note that as described later, the control circuit 124 performs control so that a period from when a task is processed by a lock-step operation to when another task is processed in the next lock-step operation is equal to or shorter than the PTPmax (maximum proof test period). That is, the control circuit 124 enables the lock-step method at predetermined timings so that an interval between a first lock-step process and a second lock-step process subsequent to the first lock-step process is equal to or shorter than the PTPmax (maximum proof test period).

The processor unit 110 reads (fetches), according to the interrupt request signal Sg30 from the interrupt controller 140, a task corresponding to that interrupt request signal Sg30 from the memory 104. Then, the processor unit 110 processes the read (fetched) task. The master processor 112 successively processes a plurality of fetched tasks (tasks A to E). Meanwhile, the checker processor 114 processes the same tasks as those processed by the master processor 12 when the processor system performs a lock-step operation under the control of the control circuit 124. In other words, when the checker processor 114 is stopped under the control of the control circuit 124, the lock-step operation is not performed. Therefore, only the master processor 112 processes the tasks. On the other hand, when the checker processor 114 is operating under the control of the control circuit 124, the lock-step operation is performed. Therefore, the master processor 112 and the checker processor 114 respectively process the same tasks.

Further, when the lock-step operation is performed, the control circuit 124 asserts a comparison enable signal Sg33. On the other hand, when the lock-step operation is not performed, the control circuit 124 negates the comparison enable signal Sg33. The comparator 106 corresponds to the comparator 6 shown in FIG. 1. When the comparison enable signal Sg33 is asserted, the comparator 106 compares a processing result of the master processor 112 (master processing result) with a processing result of the checker processor 114 (checker processing result). Then, when the master processing result is different from the checker processing result, the comparator 106 issues an error notice. When the error notice is issued, the engine system, which is the system to be controlled, performs control so that the engine is stopped (corresponding to a fault reaction time in FIG. 2) and thereby stops the engine.

The sensor input interface 152 receives, for example, a knocking sensor signal from a knocking sensor provided in the engine system. When the sensor input interface 152 receives a knocking sensor signal, the sensor input interface 152 outputs a sensor input interrupt request signal Sg21 corresponding to the knocking sensor signal to the interrupt controller 140. The sensor input interface 154 receives, for example, an oxygen sensor signal from an oxygen sensor provided in the engine system. When the sensor input interface 154 receives an oxygen sensor signal, the sensor input interface 154 outputs a sensor input interrupt request signal Sg22 corresponding to the oxygen sensor signal to the interrupt controller 140.

The driving log timer 156 outputs, for example, a driving log interrupt request signal Sg23 for recording a driving log to the interrupt controller 140 for each period T log (i.e., at an interval T log). Note that the period T log does not necessarily have to be a constant period and may instead be an arbitrary period suitable for recoding a driving log (driving time).

The timer 170 counts (or measures) a time. Further, the timer 170 outputs a fault diagnosis timer interrupt request signal Sg24 to the interrupt controller 140 for each predetermined period Tdt (i.e., at a predetermined interval Tdt). Note that the period Tdt is equal to or shorter than the PTPmax. That is, the timer 170 outputs the fault diagnosis timer interrupt request signal Sg24 to the interrupt controller 140 at an interval equal to or shorter than the PTPmax. Note that the period Tdt does not necessarily have to be a constant period at all times and may be changed as appropriate as long as it is equal to or shorter than the PTPmax. Further, a set value (period Tdx) that is equal to or shorter than the PTPmax is set in a register 172 provided in the timer 170. In this way, a fault diagnosis task is started at predetermined timings (i.e., for each period Tdt).

The interrupt controller 140 receives the above-described signals Sg21 to Sg24. Then, the interrupt controller 140 outputs an interrupt request signal Sg30 to the processor unit 110 and the control circuit 124 according to the signals Sg21 to Sg24. This interrupt request signal Sg30 can include identification information of a task that should be processed by interrupting the ongoing process (hereinafter expressed as "processed by interrupt handling" or simply as "processed"). Specifically, the interrupt controller 140 outputs, for example, an interrupt request signal Sg30 including identification information of an engine ignition control task (task A) or a fuel control task (task B) according to the signal Sg21 or Sg22. That is, the engine control tasks (the engine ignition control task and the fuel control task) are started according to the input signals (Sg21 and Sg22) supplied from the sensor input interfaces 152 and 154. In this way, an engine control task can be started by using a sensor provided in the engine to be controlled, and by doing so, the engine can be controlled. Further, the interrupt controller 140 outputs an interrupt request signal Sg30 including identification information of a driving log control task (task C) according to the signal Sg23. Further, the interrupt controller 140 outputs an interrupt request signal Sg30 including identification information of a fault diagnosis task (task E) according to the signal Sg24. Further, the interrupt controller 140 may output an interrupt request signal Sg30 including identification information of an idling task (task D) when the interrupt controller 140 does not receive any of the signals Sg21 to Sg24.

When the processor unit 110 receives an interrupt request signal Sg30 including identification information of an engine ignition control task (task A), the processor unit 110 reads the engine ignition control task from the memory 104. Then, the processor unit 110 processes the engine ignition control task and outputs a processing result to the engine control output interface 162. Then, the engine control output interface 162 outputs an engine ignition control signal for performing engine ignition control to the engine system.

When the processor unit 110 receives an interrupt request signal Sg30 including identification information of a fuel control task (task B), the processor unit 110 reads the fuel control task from the memory 104. Then, the processor unit 110 processes the fuel control task and outputs a processing result to the engine control output interface 164. Then, the engine control output interface 164 outputs a fuel control signal for performing fuel control to the engine system.

When the processor unit 110 receives an interrupt request signal Sg30 including identification information of a driving log control task (task C), the processor unit 110 reads the driving log control task from the memory 104. The processor unit 110 processes the driving log control task and outputs a processing result to the driving log control output interface 166. Then, the driving log control output interface 166 outputs a driving log control signal for recording a driving log to the engine system.

When the processor unit 110 receives an interrupt request signal Sg30 including identification information of a fault diagnosis task (task E), the processor unit 110 reads the fault diagnosis task from the memory 104. Then, the processor unit 110 processes the fault diagnosis task. This fault diagnosis task is a task by which a fault in the processor unit 110 can be detected. It is desirable that the fault diagnosis task be processed as quickly as possible.

Further, when the processor unit 110 receives an interrupt request signal Sg30 including identification information of an idling task (task D) or when the processor unit 110 does not receive any interrupt request signal Sg30, the processor unit 110 reads the idling task (task D) from the memory 104. Then, the processor unit 110 processes the idling task.

Figure 4:
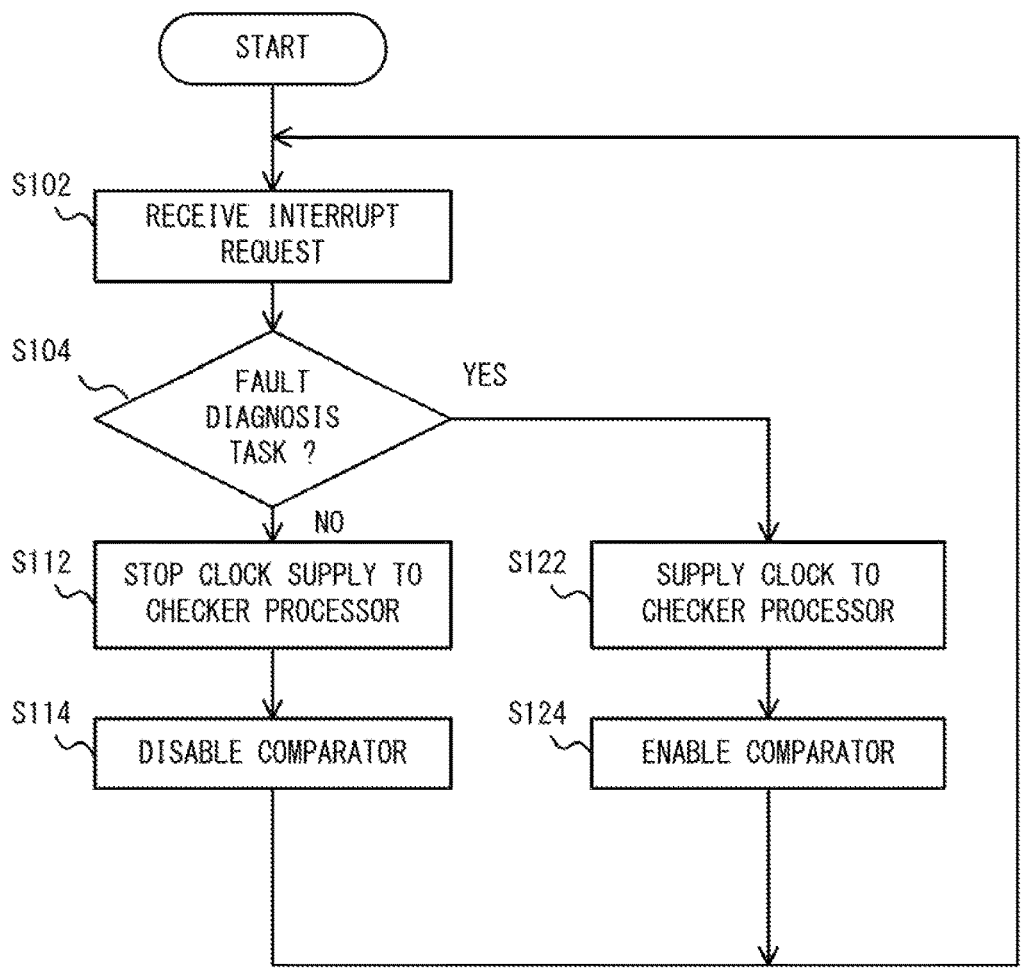
FIG. 4 is a flowchart showing processes performed by a control circuit according to the first embodiment.

FIG. 4 is a flowchart showing processes performed by the control circuit 124 according to the first embodiment. The control circuit 124 receives an interrupt request signal Sg30 form the interrupt controller 140 (S102). The control circuit 124 determines whether or not the received interrupt request signal Sg30 indicates a fault diagnosis task (task E) (S104). When the interrupt request signal Sg30 does not indicate a fault diagnosis task (task E) (No at S104), the control circuit 124 stops the supply of the clock to the checker processor 114 and thereby prevents a lock-step operation from being performed (S112). Specifically, the control circuit 124 negates the checker clock enable signal Sg32 and thereby stops the checker processor 114. Further, the control circuit 124 negates the comparison enable signal Sg33 and thereby disables the comparator 106 from operating (S114).

On the other hand, when the interrupt request signal Sg30 indicates a fault diagnosis task (Yes at S104), the control circuit 124 supplies the clock to the checker processor 114 and thereby makes control so that a lock-step operation is performed (S122). Specifically, the control circuit 124 asserts the checker clock enable signal Sg32 and thereby makes the checker processor 114 operate. Further, the control circuit 124 asserts the comparison enable signal Sg33 and thereby enables the comparator 106 to operate (S124).

In the first embodiment, through the above-described processes, a lock-step operation is performed for a fault diagnosis task (task E) and hence the fault diagnosis task (task E) is processed by both the master processor 112 and the checker processor 114. Meanwhile, a lock-step operation is not performed for other tasks (tasks A to D) and hence they are processed by the master processor 112 alone. Further, for the fault diagnosis task, the comparator 106 compares a master processing result with a checker processing result. Then, when they are different from each other, the comparator 106 issues an error notice. In this way, a fault diagnosis is performed by using a fault diagnosis task. Then, when there is a fault, an error is detected.

Figure 5:
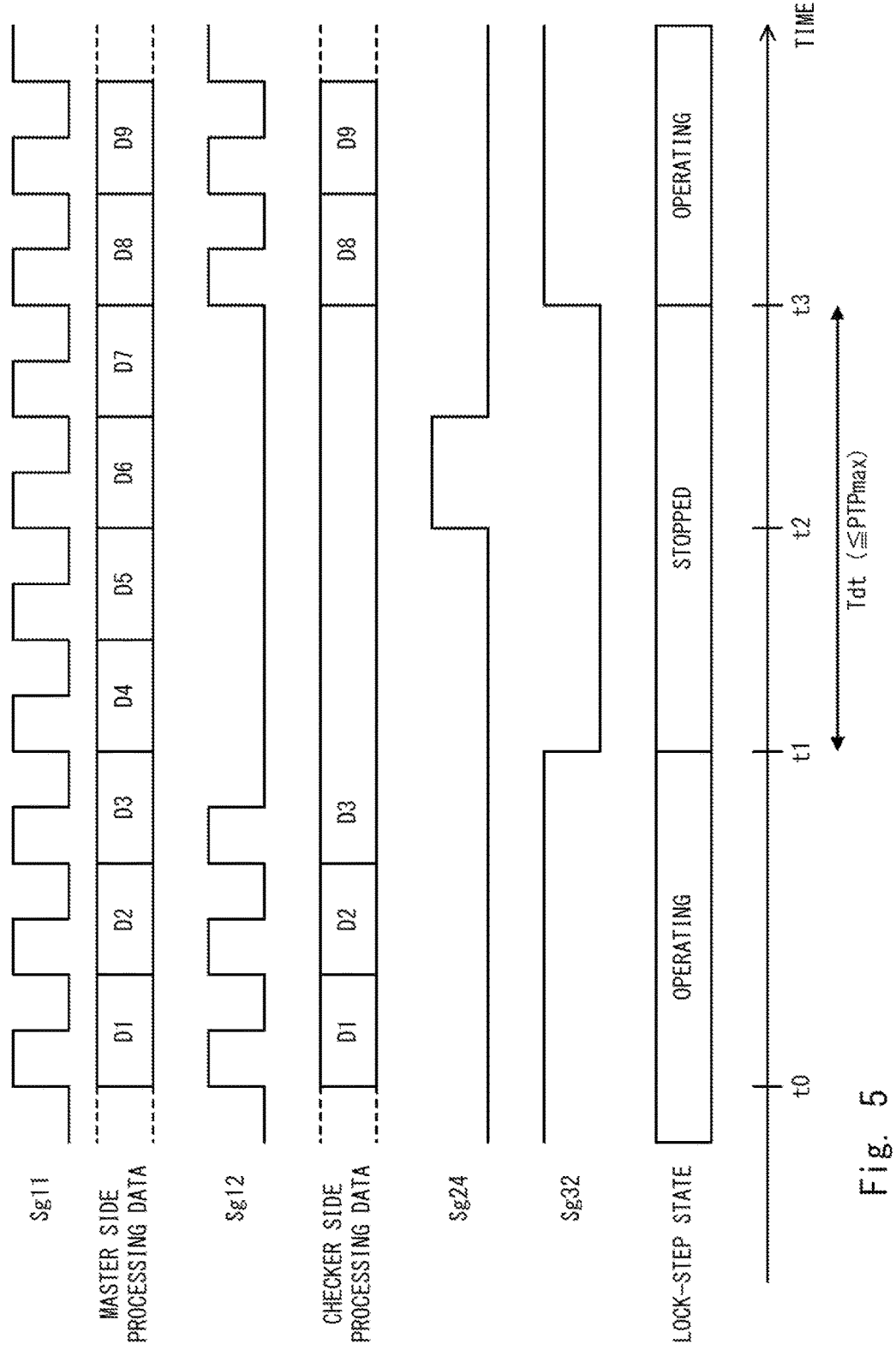
FIG. 5 is an example of a timing chart according to the first embodiment.

FIG. 5 is an example of a timing chart according to the first embodiment. In the whole period, the clock signal Sg11 is in an on-state and hence the master processor 112 processes data D1 to D9. Note that the data D1 to D3 and data D8 and D9 are data related to fault diagnosis tasks. Therefore, in a period from a time t0 to a time t1, the clock signal Sg12 is also in an on-state and hence the checker processor 114 processes the data D1 to D3. That is, a lock-step state is in an "operating state" in the period from the time t0 to t1.

In a period from the time t1 to a time t3, the data D4 to D7, which are for tasks other than the fault diagnosis task, are processed. Therefore, the control circuit 124 negates the checker clock enable signal Sg32. As a result, the clock signal Sg12 becomes an off-state. That is, the lock-step state becomes a "stopped state".

At the time t2, a fault diagnosis timer interrupt request signal Sg24 is output from the timer 170. As a result, the control circuit 124 asserts the checker clock enable signal Sg32 at the time t3. Therefore, the clock signal Sg12 becomes an on-state and hence the checker processor 114 processes the data D8 and D9. That is, the lock-step state becomes an "operating state". This period Tdt from the time t1 at which the lock-step state becomes the stopped state to the time t3 at which the lock-step state becomes the operating state is equal to or shorter than the PTPmax.

Figure 6:
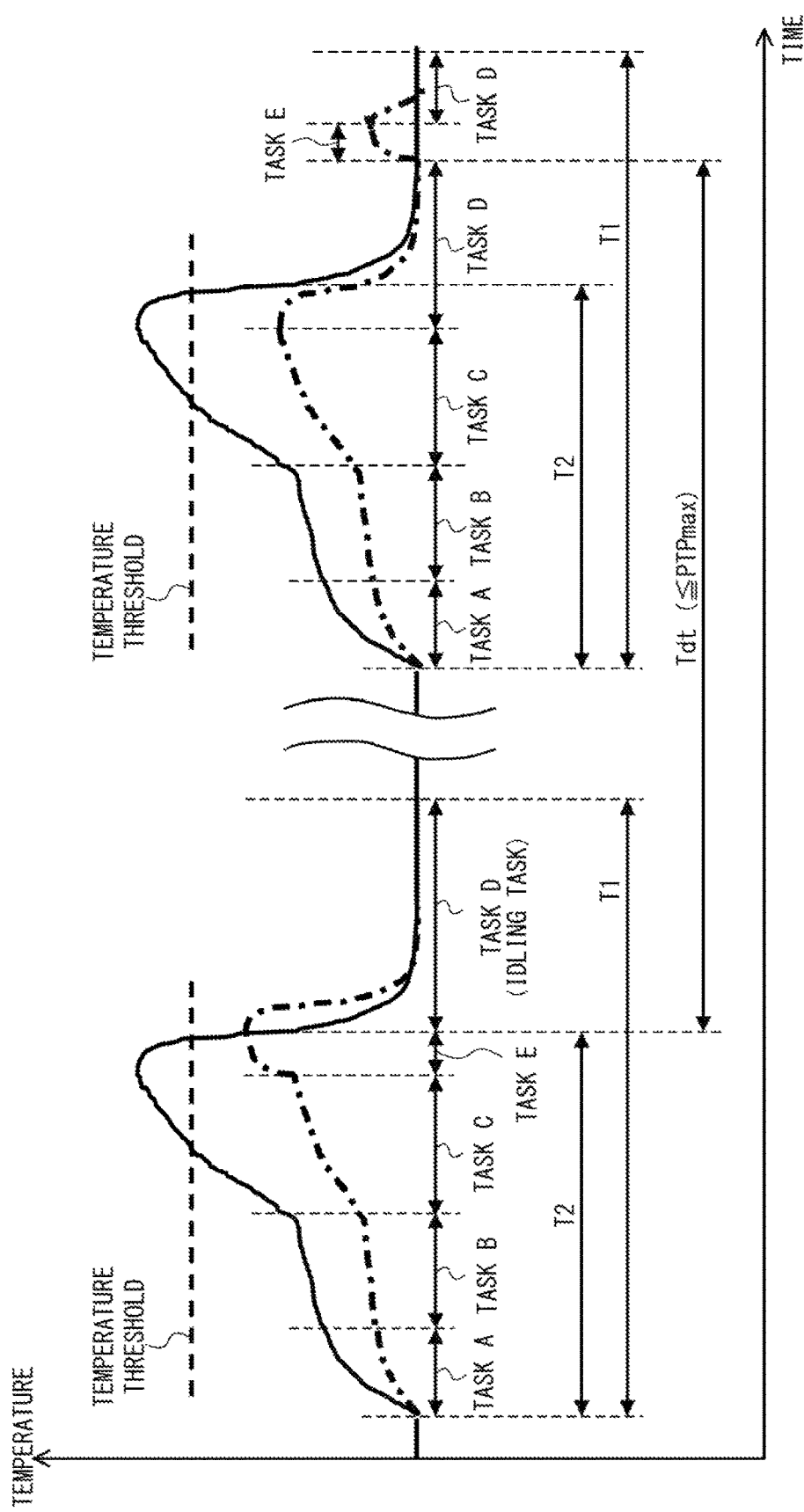
FIG. 6 is a graph showing an example of a relation between task processes and chip temperatures according to the first embodiment.

FIG. 6 is a graph showing an example of a relation between task processes and chip temperatures according to the first embodiment. In FIG. 6, the solid line indicates the temperature of the chip in the case where a lock-step operation is performed for all the tasks (tasks A to D) (hereinafter referred to as "comparative example"). Further, the dashed-dotted line indicates the temperature of the chip of the processor system 100 according to the first embodiment. Further, a period T1 corresponds to, for example, a period equivalent to one cycle (or one process) in the engine control. However, it is not limited to such periods. Further, a period T2 is an acceptable period for the processor system 100 to process a task related to the engine control. Therefore, the processor system 100 processes the tasks A to C related to the engine control during this period T2. Further, a relation "T2<T1" holds.

Further, in FIG. 6, the tasks A, B and C are processed in this listed order. After that, the task D, which is an idling task, is processed. Note that the processing order of these tasks is not limited to the example shown in FIG. 6. This order changes according to the interruption process of the interrupt controller 140. Further, in the first embodiment, the task E (fault diagnosis task) is processed by interrupt handling for each period Tdt (i.e., at the interval Tdt) as described above. Note that in the example shown in FIG. 6, the task E is processed after the task C (at the left side of FIG. 6) and in the middle of the task D (at the right side of FIG. 6). However, the processing order of the tasks is not limited to this example. For example, the task E may be processed between the processes of the tasks A and B or may be processed in the middle of the task C.

In the case where the lock-step operation is performed for all the tasks (tasks A to D), when the processor system (microcomputer) successively processes the tasks A, B and C, the checker processor as well as the master processor process all the tasks. Therefore, the processing load on the microcomputer increases. As a result, as shown in the solid line in FIG. 6, the chip temperature exceeds a temperature threshold in the processing period of the task C. Therefore, the processor system tries to perform control so that the chip temperature remains below or equal to the temperature threshold. As a result, the processor system cannot process the task C.

In contrast to this, the processor system 100 is configured so that only the task E (fault diagnosis task) is processed by the lock-step operation. In this case, the checker processor 114 processes only the task E. In other words, the tasks A to D are not processed by the lock-step operation. That is, the tasks A to D are processed by the master processor 112 alone, not by both the master processor 112 and the checker processor 114. Therefore, the increase in the chip temperature due to the processing of the tasks A to D is roughly halved compared to the comparative example.

Note that in the first embodiment, the chip temperature rises in the period in which the task E is processed by interrupt handling because the checker processor 114 as well as the master processor 112 processes the task E. However, the processing period of the task E is the minimum period in which a fault can be detected. Therefore, the increase in the temperature in the processing period of the task E can be reduced to the minimum. As a result, in the first embodiment, the chip temperature does not exceed the temperature threshold throughout the processing period of all the tasks. Therefore, the processor system 100 according to the first embodiment can reduce the heat generation amount.

Further, in the first embodiment, the period Tdt from when the task E is processed to when the next task E is processed (i.e., period from when a lock-step operation is performed to when the next lock-step operation is performed) is equal to or shorter than the PTPmax as described above. Further, as described above, a fault can be detected when a lock-step operation is performed. Therefore, the processor system 100 according to the first embodiment can detect a fault within a predetermined period (PTPmax). That is, the processor system 100 according to the first embodiment can detect a fault within a predetermined period (PTPmax) while reducing the heat generation amount.

Second Embodiment

Next, a second embodiment is explained. In the above-described first embodiment, one timer 170 is used to process a fault diagnosis task (task E) by interrupt handling. In contrast to this, in the second embodiment, a plurality of timers are provided to process fault diagnosis tasks (tasks E) by interrupt handling. That is, in the second embodiment, a plurality of types of fault diagnosis tasks are processed by interrupt handling. Note that in the following explanations, the same symbols are assigned to components that are substantially identical to those already explained above and their explanations are omitted as appropriate.

Figure 7:
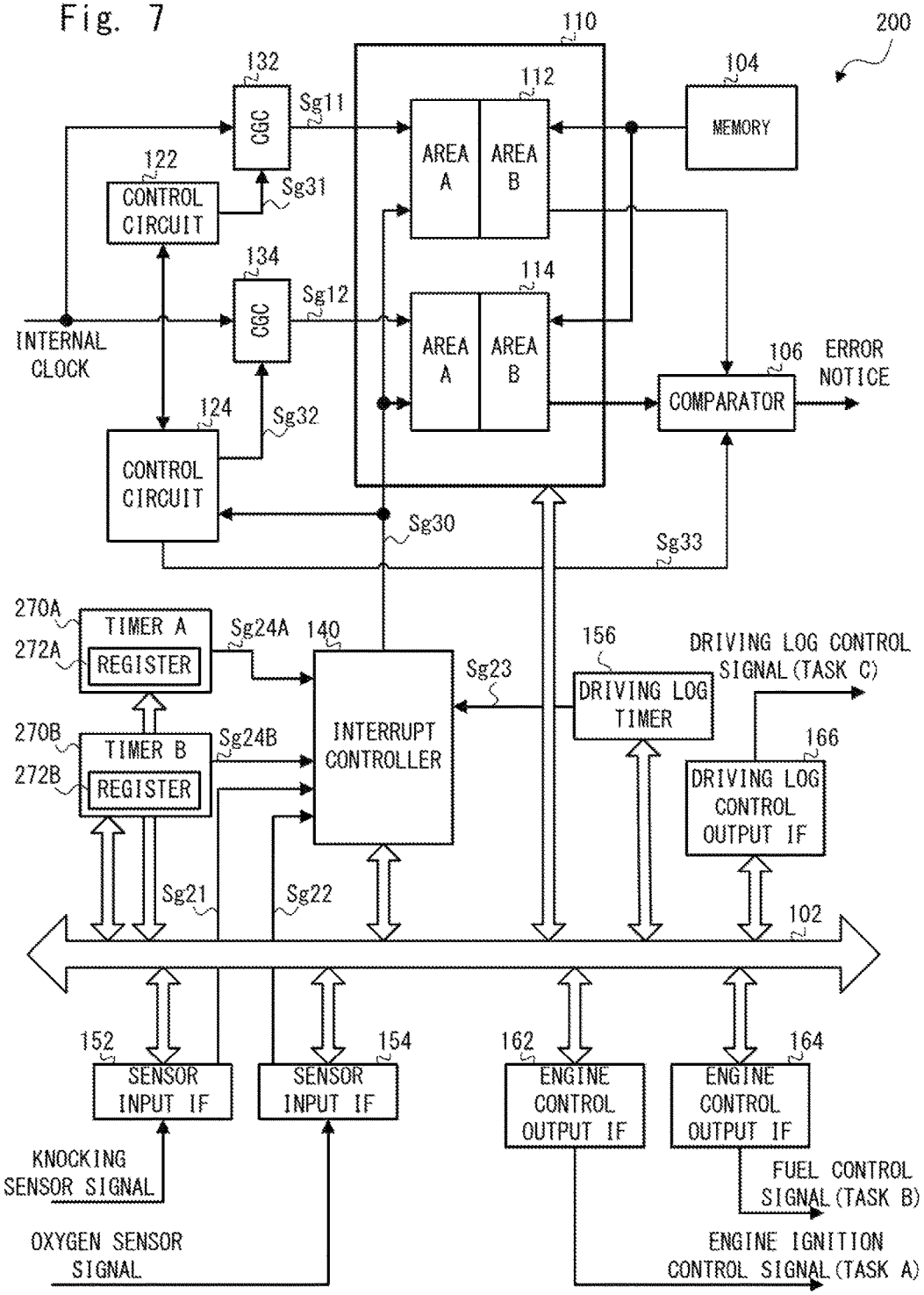
FIG. 7 shows a configuration of a processor system according to a second embodiment.

FIG. 7 shows a configuration of a processor system 200 according to the second embodiment. The processor system 200 according to the second embodiment has a configuration that is obtained by replacing the timer 170 in the processor system 100 according to the first embodiment by two timers 270A and 270B. The configurations/components other than the timers 270A and 270B in the processor system 200 according to the second embodiment are similar to those of the first embodiment.

The timer 270A counts (or measures) a time. Further, the timer 270A outputs a fault diagnosis timer interrupt request signal Sg24A to the interrupt controller 140 for each predetermined period TdtA. Note that the period TdtA is equal to or shorter than the PTPmax. That is, the timer 270A outputs the fault diagnosis timer interrupt request signal Sg24A to the interrupt controller 140 at an interval equal to or shorter than the PTPmax. Note that the period TdtA does not necessarily have to be a constant period at all times and may be changed as appropriate as long as it is equal to or shorter than the PTPmax. Further, a set value (period TdxA) that is equal to or shorter than the PTPmax is set in a register 272A provided in the timer 270A. In this way, a fault diagnosis task A is started at a predetermined timing (s) (i.e., for each period TdtA).

The timer 270B counts (or measures) a time. Further, the timer 270B outputs a fault diagnosis timer interrupt request signal Sg24B to the interrupt controller 140 for each predetermined period TdtB. Note that the period TdtB is equal to or shorter than the PTPmax. That is, the timer 270B outputs the fault diagnosis timer interrupt request signal Sg24B to the interrupt controller 140 at an interval equal to or shorter than the PTPmax. Note that the period TdtB does not necessarily have to be a constant period at all times and may be changed as appropriate as long as it is equal to or shorter than the PTPmax. Further, a set value (period TdxB) that is equal to or shorter than the PTPmax is set in a register 272B provided in the timer 270B. In this way, a fault diagnosis task B is started at a predetermined timing (s) (i.e., for each period TdtB).

The interrupt controller 140 receives signals Sg24A and Sg24B in addition to the signals Sg21 to Sg23. The interrupt controller 140 outputs an interrupt request signal Sg30 including identification information of a fault diagnosis task A (task EA) according to the signal Sg24A. Similarly, the interrupt controller 140 outputs an interrupt request signal Sg30 including identification information of a fault diagnosis task B (task EB) according to the signal Sg24B.

When the interrupt request signal Sg30 from the interrupt controller 140 indicates the fault diagnosis task A (task EA: first fault diagnosis task) or the fault diagnosis task B (task EB: second fault diagnosis task), the control circuit 124 performs the processes in the steps S122 and S124 shown in FIG. 4. On the other hand, when the interrupt request signal Sg30 from the interrupt controller 140 indicates neither of the fault diagnosis task A (task EA: first fault diagnosis task) and the fault diagnosis task B (task EB: second fault diagnosis task), the control circuit 124 performs the processes in the steps S112 and S114 shown in FIG. 4. That is, in the second embodiment, the fault diagnosis task A (task EA) and the fault diagnosis task B (task EB) are processed by a lock-step operation. In other words, the fault diagnosis task A (task EA) and the fault diagnosis task B (task EB) are processed by the checker processor 114 as well as the master processor 112. In this way, a fault diagnosis is performed by a lock-step operation by using the fault diagnosis task A (task EA) and the fault diagnosis task B (task EB).

When the processor unit 110 receives an interrupt request signal Sg30 including identification information of the fault diagnosis task A (task EA), the processor unit 110 reads the fault diagnosis task A from the memory 104. Then, the processor unit 110 processes the fault diagnosis task A. This fault diagnosis task A is a task that is processed by using an area A (first area) of the master processor 112 and an area A (first area) of the checker processor 114. That is, the fault diagnosis task A is a task by which a fault in the area A (first area) of the master processor 112 and the area A (first area) of the checker processor 114 can be detected. It is desirable that the fault diagnosis task A is processed as quickly as possible.

When the processor unit 110 receives an interrupt request signal Sg30 including identification information of the fault diagnosis task B (task EB), the processor unit 110 reads the fault diagnosis task B from the memory 104. Then, the processor unit 110 processes the fault diagnosis task B. This fault diagnosis task B is a task that is processed by using an area B (second area) of the master processor 112 and an area B (second area) of the checker processor 114. That is, the fault diagnosis task B is a task by which a fault in the area B (second area) of the master processor 112 and the area B (second area) of the checker processor 114 can be detected. It is desirable that the fault diagnosis task B is processed as quickly as possible.

Note that the fault diagnosis task A is configured so as to be processed by using components disposed in the area A of the master processor 112 and the area A of the checker processor 114. That is, when the fault diagnosis task A is being processed, components disposed outside the area A of the master processor 112 and those disposed outside the area A of the checker processor 114 do not necessarily have to be operated. Similarly, the fault diagnosis task B is configured so as to be processed by using components disposed in the area B of the master processor 112 and the area B of the checker processor 114. That is, when the fault diagnosis task B is being processed, components disposed outside the area B of the master processor 112 and those disposed outside the area B of the checker processor 114 do not necessarily have to be operated. Note that the areas A and B may be completely separated or may overlap each other.

Figure 8:
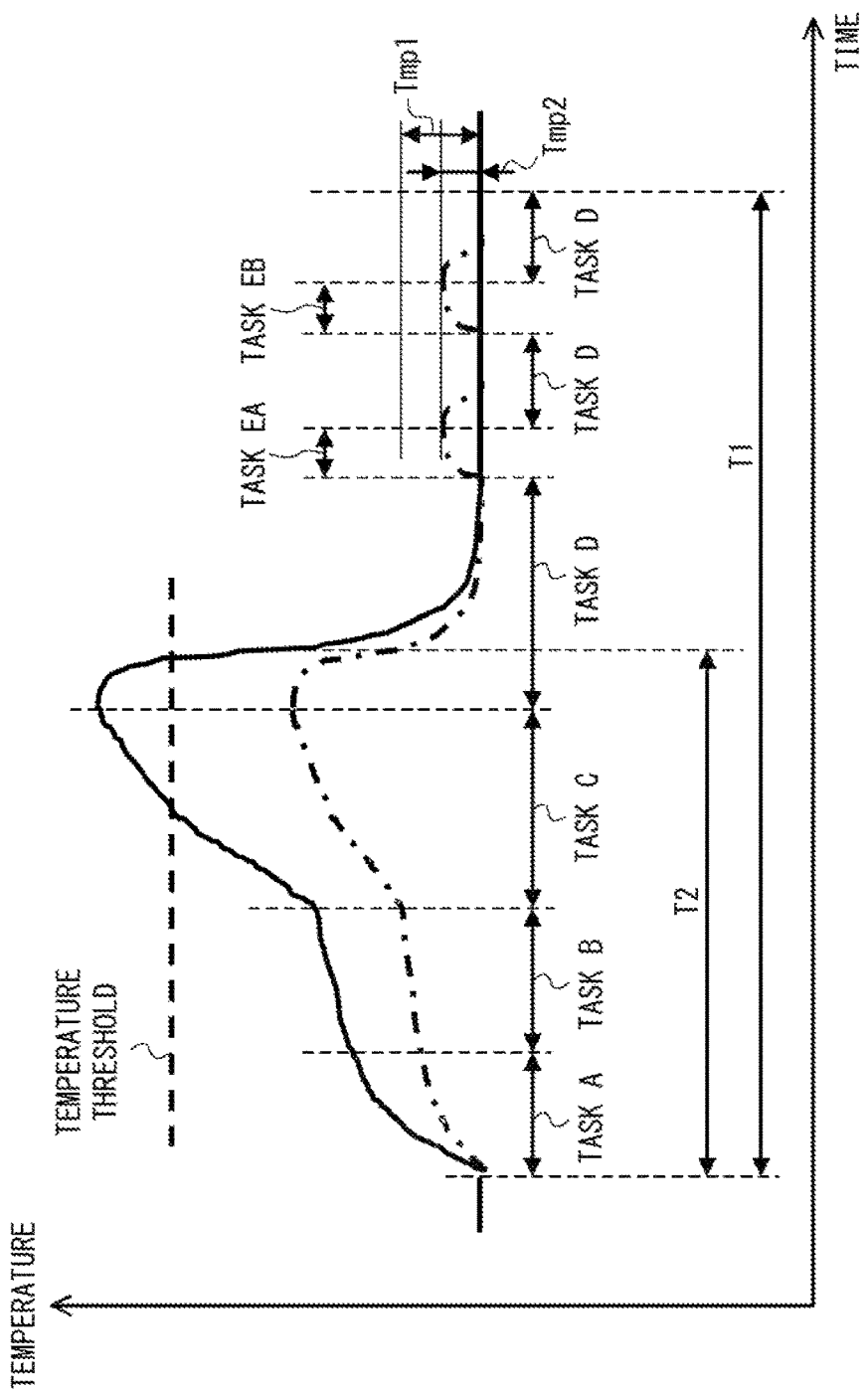
FIG. 8 is a graph showing an example of a relation between task processes and chip temperatures according to the second embodiment.

FIG. 8 is a graph showing an example of a relation between task processes and chip temperatures according to the second embodiment. In FIG. 8, the solid line indicates the temperature of the chip in the case (comparative example) where a lock-step operation is performed for all the tasks (tasks A to D). Further, the dashed-dotted line indicates the temperature of the chip of the processor system 200 according to the second embodiment. In the example shown in FIG. 8, the tasks EA and EB are processed in the middle of the task D. However, the processing order is not limited to this example. The tasks EA and EB may be processed between the processes of the tasks A and B, or may be processed in the middle of the task C.

Similarly to the first embodiment, the processor system 200 according to the second embodiment is configured so that only the tasks EA and EB (fault diagnosis tasks) are processed by a lock-step operation. In this case, the checker processor 114 processes only the tasks EA and EB. In other words, the tasks A to D are not processed by the lock-step operation. That is, the tasks A to D are processed by the master processor 112 alone, not by both the master processor 112 and the checker processor 114. Therefore, the increase in the chip temperature due to the tasks A to D is roughly halved compared to the comparative example.

Note that in the second embodiment, the chip temperature rises in the period in which the tasks EA and EB are processed by interrupt handling because the checker processor 114 as well as the master processor 112 processes the tasks EA and EB. However, the processing period of each of the tasks EA and EB is the minimum period in which a fault can be detected. Therefore, the temperature increase Tmp2 in the processing period of each of the tasks EA and EB can be reduced to the minimum. Further, in the second embodiment, when the task EA is processed, only the areas A of the master processor 112 and the checker processor 114 are operated. Similarly, when the task EB is processed, only the areas B of the master processor 112 and the checker processor 114 are operated. That is, the number of components that are operated in the period in which the fault diagnosis task is processed in the second embodiment is smaller than that in the first embodiment. Therefore, the temperature increase Tmp2 in the processing periods of each of the tasks EA and EB in the second embodiment is smaller than the temperature increase Tmp1 in the processing period of the fault diagnosis task (task E) in the first embodiment. Consequently, the processor system 200 according to the second embodiment can reduce the heat generation amount more than the first embodiment does.

Further, as described above, each of the period TdtA from when the task EA is processed to when the next task EA is processed and the period TdtB from when the task EB is processed to when the next task EB is processed is equal to or shorter than the PTPmax in the second embodiment as in the case of the first embodiment. Therefore, each of the period from when the task EA is processed to when the task EB is processed and the period from when the task EB is processed to when the next task EA is processed (i.e., period from when a lock-step operation is performed to when the next lock-step operation is performed) is equal to or shorter than the PTPmax. Therefore, the processor system 200 according to the second embodiment can also detect a fault within a predetermined period (PTPmax) while reducing the heat generation amount.

Third Embodiment

Next, a third embodiment is explained. The third embodiment is different from the above-described embodiments in that no fault diagnosis task is processed by interrupt handling. In the third embodiment, whether a lock-step operation should be performed or not is determined according to the type of a task related to the engine control as explained below.

In the third embodiment, the task A (engine ignition control task), the task B (fuel control task), and the task D (idling task) are categorized as "high importance tasks" (first tasks). Meanwhile, the task C (driving log control task) is categorized as "low importance task" (second task). However, the way of categorizing tasks is not limited to this example. Note that the "high importance tasks" are tasks that are highly important for the safety and the reliability etc. in the system (such as an engine system), which is the subject to be controlled by the processor system. The "low importance tasks" are tasks that are less important for the safety and the reliability etc. in the system, which is the subject to be controlled by the processor system. As described later, a processor system according to the third embodiment is configured so that the processor system performs a lock-step operation when it processes a high importance task and does not perform a lock-step operation when it processes a low importance task. That is, the "high importance tasks" are tasks for which a fault that occurs during their execution needs to be detected.

Figure 9:
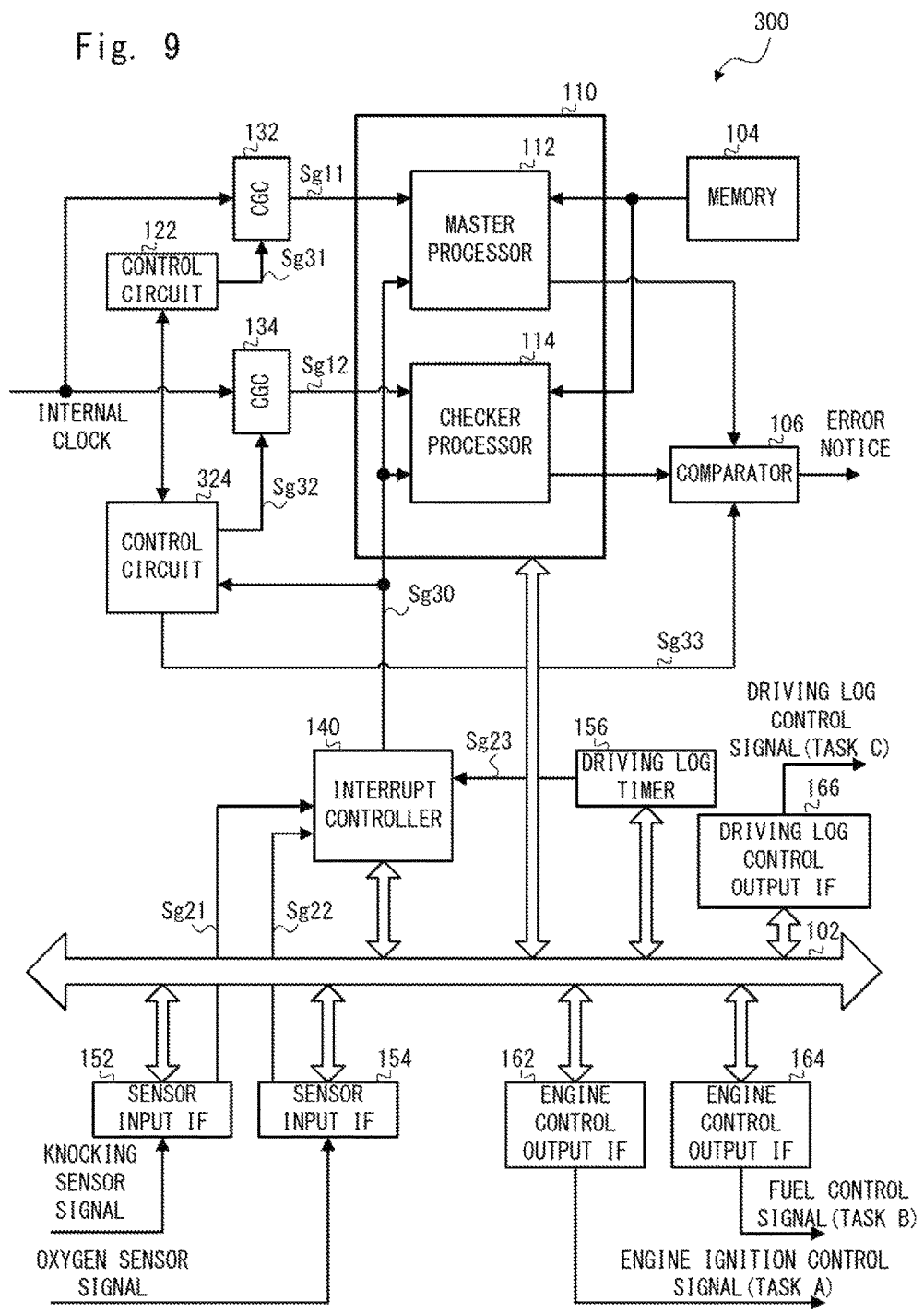
FIG. 9 shows a configuration of a processor system according to a third embodiment.

FIG. 9 shows a configuration of a processor system 300 according to the third embodiment. The processor system 300 according to the third embodiment has a configuration that is obtained by removing the timer 170 and replacing the control circuit 124 by a control circuit 324 (control unit) in the processor system 100 according to the first embodiment. The configurations/components other than the above-described difference from the first embodiment in the processor system 300 according to the third embodiment are similar to those of the first embodiment.

Similarly to the control circuit 124, the control circuit 324 determines whether a lock-step operation should be performed or not according to an interrupt request signal Sg30 from the interrupt controller 140. Further, similarly to the control circuit 124, the control circuit 324 controls the CGC 134 as to whether the CGC 134 should supply a clock signal Sg12 to the checker processor 114 or not by asserting or negating a checker clock enable signal Sg32. Further, similarly to the control circuit 124, the control circuit 324 asserts a comparison enable signal Sg33 when the lock-step operation is performed, and negates the comparison enable signal Sg33 when the lock-step operation is not performed.

Figure 10:
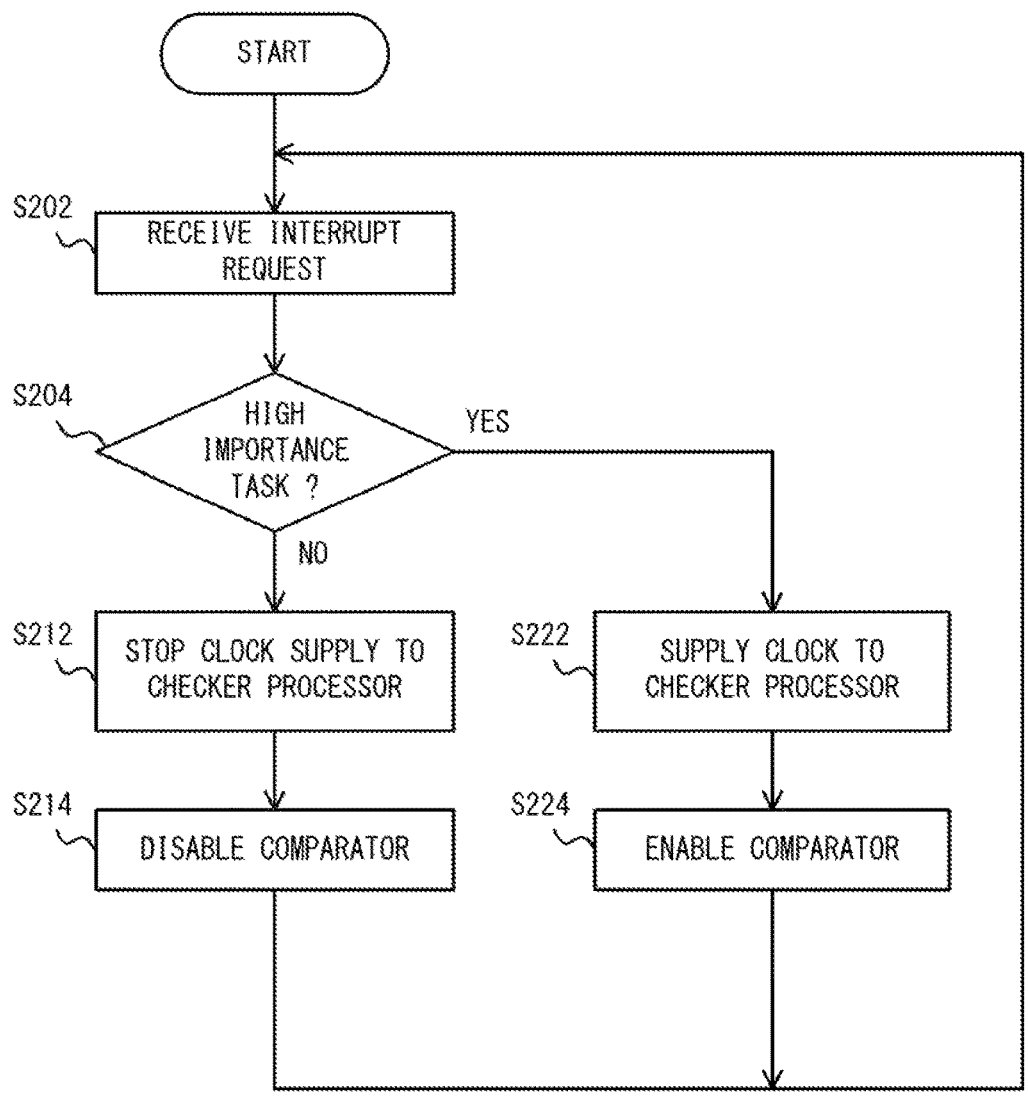
FIG. 10 is a flowchart showing processes performed by a control circuit according to the third embodiment.

FIG. 10 is a flowchart showing processes performed by the control circuit 324 according to the third embodiment. The control circuit 324 receives an interrupt request signal Sg30 from the interrupt controller 140 (S202). The control circuit 324 determines whether or not the received interrupt request signal Sg30 indicates a high importance task (e.g., the task A or B) (S204). When the interrupt request signal Sg30 does not indicate a high importance task (No at S204), the control circuit 324 stops the supply of the clock to the checker processor 114 and thereby prevents a lock-step operation from being performed (S212). Specifically, the control circuit 324 negates the checker clock enable signal Sg32 and thereby stops the checker processor 114. Further, the control circuit 324 negates the comparison enable signal Sg33 and thereby disables the comparator 106 from operating (S214). That is, the control circuit 324 disables the lockstep method for tasks other than the engine control tasks (e.g., for the driving log control task).

On the other hand, when the interrupt request signal Sg30 indicates a high importance task (Yes at S204), the control circuit 324 supplies the clock to the checker processor 114 and thereby makes control so that a lock-step operation is performed (S222). Specifically, the control circuit 324 asserts the checker clock enable signal Sg32 and thereby makes the checker processor 114 operate. Further, the control circuit 324 asserts the comparison enable signal Sg33 and thereby enables the comparator 106 to operate (S224). That is, the control circuit 324 enables the lock step method for the engine control tasks (e.g., the engine ignition control task and the fuel control task).

In the third embodiment, the lock step operation is performed for the high important tasks (tasks A, B and D) and these tasks are processed by both the master processor 112 and the checker processor 114. On the other hand, the lock step operation is not performed for the other tasks (task C) and these tasks are processed by the master processor 112 alone. Further, for the high importance tasks, the comparator 106 compares a master processing result with a checker processing result. Then, when they are different from each other, the comparator 106 issues an error notice. In this way, a fault diagnosis is performed by using a high importance task. Then, when there is a fault, an error is detected.

Figure 11:
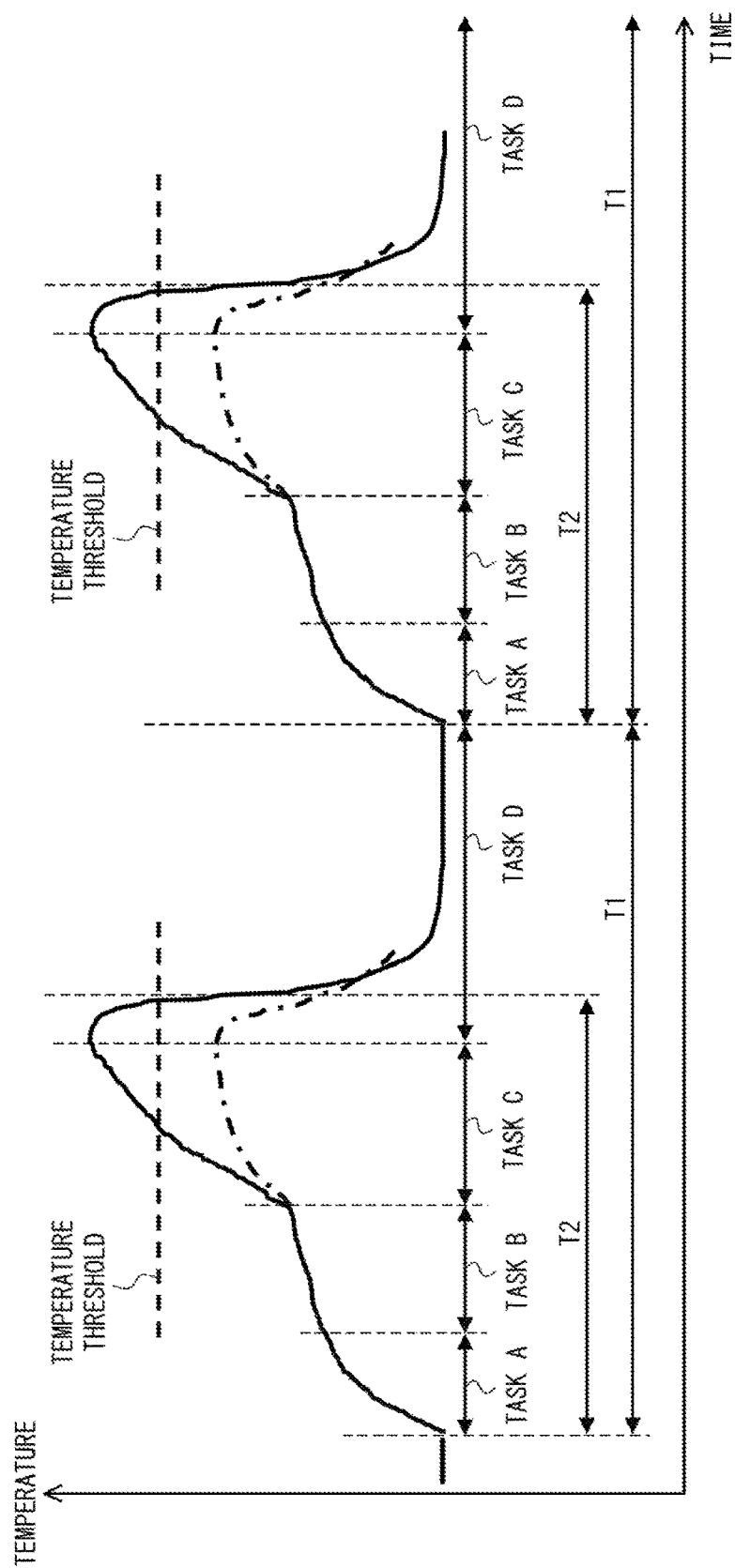
FIG. 11 is a graph showing an example of a relation between task processes and chip temperatures according to the third embodiment.

FIG. 11 is a graph showing an example of a relation between task processes and chip temperatures according to the third embodiment. In FIG. 11, the solid line indicates the temperature of the chip in the case where a lock-step operation is performed for all the tasks (tasks A to D) (hereinafter referred to as "comparative example"). Further, the dashed-dotted line indicates the temperature of the chip of the processor system 300 according to the third embodiment.

Further, in FIG. 11, the tasks A, B and C are processed in this listed order. After that, the task D, which is an idling task, is processed. Note that the processing order of these tasks is not limited to the example shown in FIG. 11. This order changes according to the interruption process of the interrupt controller 140.

As in the case of the above-described other embodiments, in the comparative example, since the lock-step operation is performed for all the tasks, the processing load on the microcomputer increases. As a result, as shown in the solid line in FIG. 11, the chip temperature exceeds a temperature threshold in the processing period of the task C. Therefore, the processor system tries to perform control so that the chip temperature remains below or equal to the temperature threshold. As a result, the processor system cannot process the task C.

In contrast to this, the processor system 300 according to the third embodiment is configured so that the processor system 300 does not perform a lock-step operation when it processes a low importance task (task C). That is, the checker processor 114 does not process the low importance task (task C). Therefore, the increase in the chip temperature due to the processing of the task C is roughly halved compared to the comparative example. As a result, in the third embodiment, the chip temperature does not exceed the temperature threshold throughout the processing period of all the tasks. Therefore, the processor system 300 according to the third embodiment can reduce the heat generation amount.

Note that the requirement that fault detection needs to be performed so as to satisfy the maximum proof test period (PTPmax) needs to be satisfied only when a high importance task is processed. In other words, the requirement that fault detection needs to be performed so as to satisfy the maximum proof test period (PTPmax) does not necessarily have to be satisfied when a low importance task is processed. Note that in the third embodiment, a lock-step operation is always performed when a high importance task is processed. That is, in such a situation, the period from when a lock-step operation is performed to when the next lock-step operation is performed is roughly zero. Therefore, the processor system 300 according to the third embodiment can detect a fault within a predetermined period (PTPmax). That is, the processor system 300 according to the third embodiment can detect a fault within a predetermined period (PTPmax) while reducing the heat generation amount. Further, in the third embodiment, when compared to the first embodiment and the like, there is no need to separately process a fault diagnosis task from the tasks necessary for the engine control (i.e., the tasks A and B) by interrupting the ongoing processes of such engine control tasks.

Note that in the first embodiment and the like, the tasks A to D are not categorized into high important tasks and low important tasks. However, in the first embodiment and the like, even if only high importance tasks are processed by interrupt handling in the period from when a fault diagnosis task is processed by a lock-step operation to when another fault diagnosis task is processed by the next lock-step operation, a fault can be detected within a predetermined period (PTPmax).

Fourth Embodiment

Next, a fourth embodiment is explained. The fourth embodiment is different from the third embodiment in that the control circuit determines whether a lock-step operation should be performed or not by using a fetch address of the processor unit 110 (the master processor 112) in the fourth embodiment.

Figure 12:
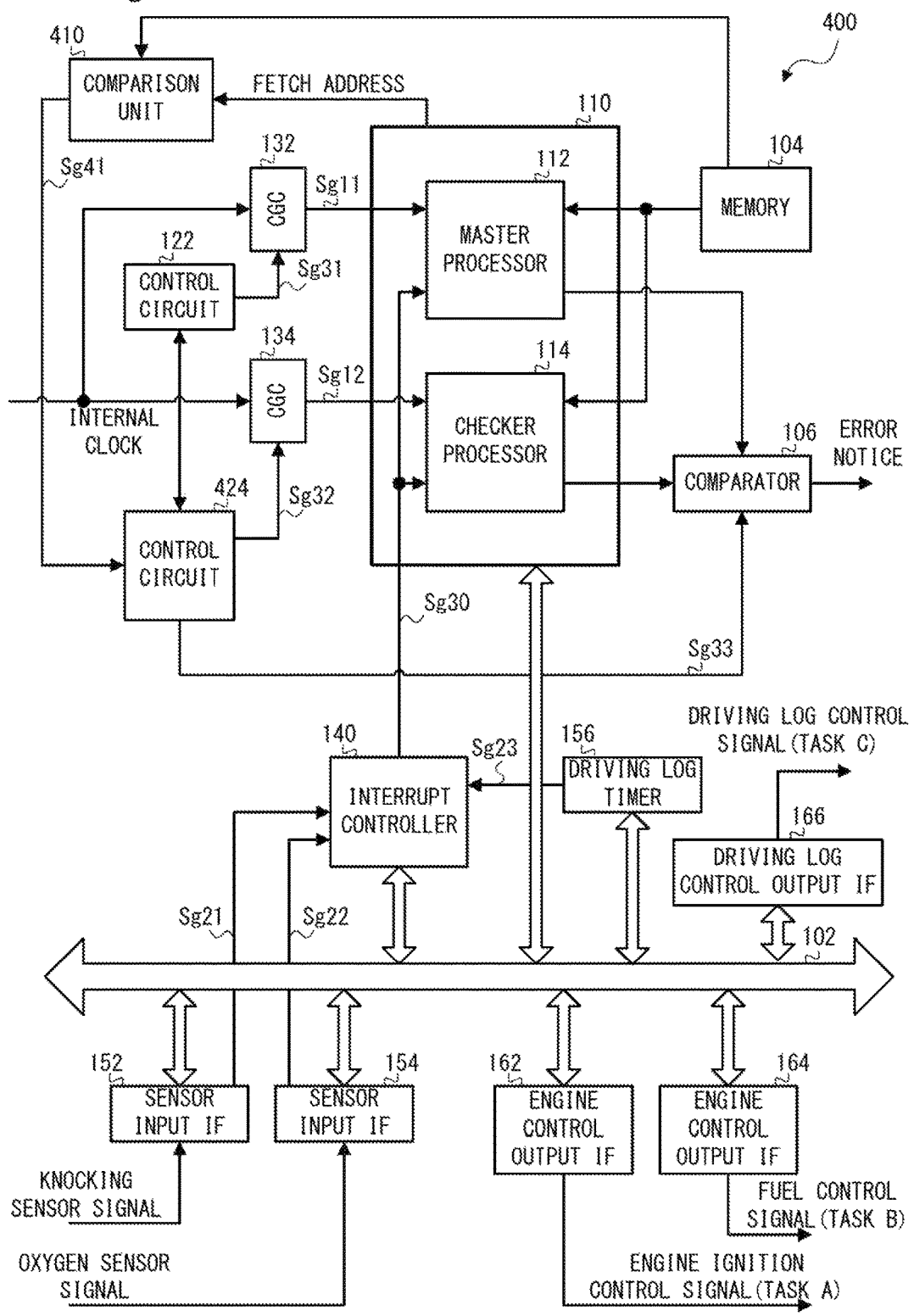
FIG. 12 shows a configuration of a processor system according to a fourth embodiment.

FIG. 12 shows a configuration of a processor system 400 according to the fourth embodiment. The processor system 400 according to the fourth embodiment has a configuration that is obtained by replacing the control circuit 324 by a control circuit 424 (control unit) in the processor system 300 according to the third embodiment. Further, the processor system 400 according to the fourth embodiment includes a comparison unit 410 that compares a fetch address with address information of a high importance task in the memory 104. Further, the control circuit 424 receives no interrupt request signal Sg30 from the interrupt controller 140. Instead, the control circuit 424 receives an address match signal Sg41 from the comparison unit 410. The configurations/components other than the above-described differences from the third embodiment in the processor system 400 according to the fourth embodiment are similar to those of the third embodiment.

Figure 13:
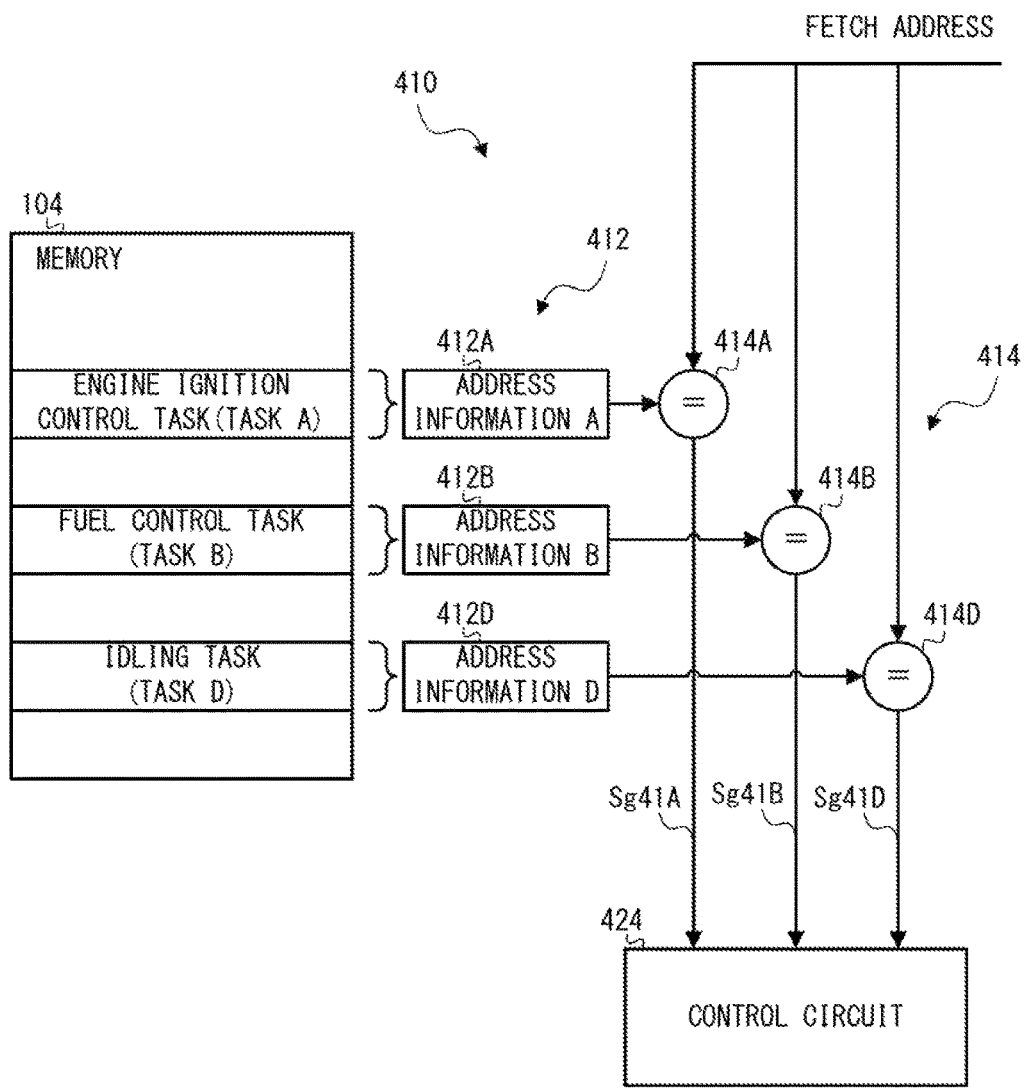
FIG. 13 shows a configuration of a comparison unit according to the fourth embodiment.

FIG. 13 shows a configuration of the comparison unit 410 according to the fourth embodiment. The comparison unit 410 includes an address information extraction unit 412 (412A, 412B and 412D) and an address comparison unit 414 (414A, 414B and 414D). The address information extraction unit 412 extracts information of an address(s) at which a high importance task(s) are stored in the memory 104. Specifically, the address information extraction unit 412A extracts address information (address information A) of an engine ignition control task (task A). The address information extraction unit 412B extracts address information (address information B) of a fuel control task (task B). The address information extraction unit 412D extracts address information (address information D) of an idling task (task D).

The address comparison unit 414 compares a fetch address of the processor unit 110 with the address information of a high importance task. Then, when they match each other, the address comparison unit 414 outputs an address match signal Sg41 to the control circuit 424. Specifically, the address comparison unit 414A compares the fetch address with the address information A extracted by the address information extraction unit 412A. Then, when the fetch address matches the address information A, the address comparison unit 414A outputs an address match signal Sg41A to the control circuit 424.

Similarly, the address comparison unit 414B compares the fetch address with the address information B extracted by the address information extraction unit 412B. Then, when the fetch address matches the address information B, the address comparison unit 414B outputs an address match signal Sg41B to the control circuit 424. Further, the address comparison unit 414D compares the fetch address with the address information D extracted by the address information extraction unit 412D. Then, when the fetch address matches the address information D, the address comparison unit 414D outputs an address match signal Sg41D to the control circuit 424.

The control circuit 424 determines whether a lock-step operation should be performed or not according to the address match signal Sg41 (Sg41A, Sg41B, Sg41D). Specifically, when the control circuit 424 receives the address match signal Sg41 (Sg41A, Sg41B, Sg41D), the control circuit 424 determines that the processor unit 110 processes a high importance task. In this case, the control circuit 424 performs a process for performing a lock-step operation (the processes in the step S222 and S224 in FIG. 10). On the other hand, when the control circuit 424 does not receive the address match signal Sg41 (Sg41A, Sg41B, Sg41D), the control circuit 424 determines that the processor unit 110 processes a low importance task. In this case, the control circuit 424 performs a process for preventing the processor unit from performing a lock-step operation (the processes in the step S212 and S214 in FIG. 10).

Similarly to the third embodiment, in the fourth embodiment, when a high importance task is processed, a lock-step operation is performed. On the other hand, when a low importance task is processed, a lock-step operation is not performed. Therefore, similarly to the third embodiment, the processor system 400 according to the fourth embodiment can detect a fault within a predetermined period (PTPmax) while reducing the heat generation amount. Further, the processor system 400 according to the fourth embodiment determines the type of a task to be processed, by using a fetch address. Therefore, the processor system 400 according to the fourth embodiment can determine whether a lock-step operation should be performed or not according to the type of a task that is processed by the processor unit 110 without using the interrupt request signal Sg30 supplied from the interrupt controller 140.

Fifth Embodiment

Next, a fifth embodiment is explained. The fifth embodiment is different from the third embodiment in that: a lock-step operation is performed for arbitrary tasks under normal conditions; but when the load on the processor unit 110 increases, a lock-step operation is not performed for low importance tasks.

Figure 14:
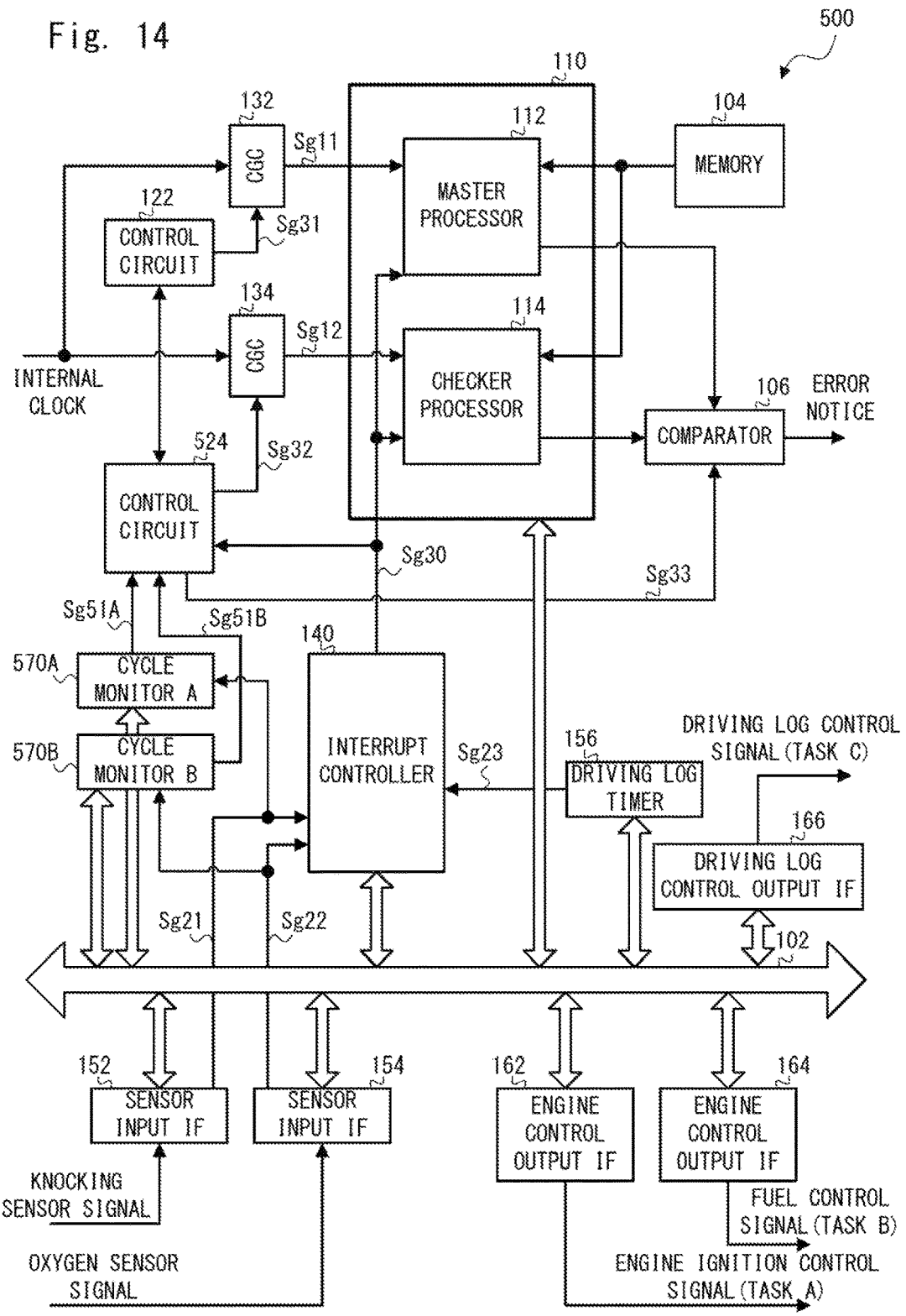
FIG. 14 shows a configuration of a processor system according to a fifth embodiment.

FIG. 14 shows a configuration of a processor system 500 according to the fifth embodiment. The processor system 500 according to the fifth embodiment has a configuration that is obtained by replacing the control circuit 324 by a control circuit 524 (control unit) in the processor system 300 according to the third embodiment. Further, the processor system 500 according to the fifth embodiment includes a cycle monitor 570 (cycle monitors 570A and 570B). The configurations/components other than the above-described differences from the third embodiment in the processor system 500 according to the fifth embodiment are similar to those of the third embodiment.

The cycle monitor 570 detects the frequency of the occurrences of interruptions for high importance tasks (tasks A and B). Further, when the interruption frequency exceeds a predetermined criterion, the cycle monitor 570 outputs a cycle monitor interrupt request signal Sg51 to the control circuit 524.

Specifically, the cycle monitor 570A monitors the interval between the interruptions (cycle of interruptions) by a sensor input interrupt request signal Sg21. When the interruption interval of the sensor input interrupt request signal Sg21 is shorter than a predetermined reference interval, the cycle monitor 570A outputs a cycle monitor interrupt request signal Sg51A to the control circuit 524. In other words, when the interruption cycle of the sensor input interrupt request signal Sg21 exceeds the predetermined reference cycle, the cycle monitor 570A outputs the cycle monitor interrupt request signal Sg51A to the control circuit 524.

Similarly, the cycle monitor 570B monitors the interval between the interruptions (cycle of interruptions) by a sensor input interrupt request signal Sg22. When the interruption interval of the sensor input interrupt request signal Sg22 is shorter than a predetermined reference interval, the cycle monitor 570B outputs a cycle monitor interrupt request signal Sg51B to the control circuit 524. In other words, when the interruption cycle of the sensor input interrupt request signal Sg22 exceeds the predetermined reference cycle, the cycle monitor 570B outputs the cycle monitor interrupt request signal Sg51B to the control circuit 524.

Note that the above-described reference interval and the reference cycle are determined based on how often interruptions caused by the signal monitored by the cycle monitor 570 lead to increase of the load on the processor unit 110, and whether or not the chip temperature exceeds a temperature threshold because of this increased load (shown in FIG. 6, the later-described FIG. 16, and so on). That is, when the interruption interval of the sensor input interrupt request signal is equal to or longer than the reference interval (i.e., when the interruption cycle is equal to or shorter than the reference cycle), the load on the processor unit 110 is not high enough to make the chip temperature exceed the temperature threshold.

On the other hand, when the interruption interval of the sensor input interrupt request signal is shorter than the reference interval (i.e., when the interruption cycle exceeds the reference cycle), there is a possibility that the chip temperature exceeds the temperature threshold because the load on the processor unit 110 is high. Therefore, when the load on the processor unit 110 is high, the cycle monitor 570 outputs a cycle monitor interrupt request signal Sg51 (Sg51A, Sg51B) to the control circuit 524. Note that the cycle monitor 570 may clear the count of interruption cycles at an arbitrary timing after outputting the cycle monitor interrupt request signal Sg51.

Similarly to the control circuit 124, the control circuit 524 determines whether a lock-step operation should be performed or not according to an interrupt request signal Sg30 from the interrupt controller 140. Note that as described later, the control circuit 524 determines whether a lock-step operation should be performed or not according to whether the load on the processor unit 110 is high or not. In other words, the control circuit 524 determines whether a lock-step operation should be performed or not at least according to the frequency of the processing operations of high importance tasks.

Further, similarly to the control circuit 124, the control circuit 524 controls the CGC 134 as to whether the CGC 134 should supply a clock signal Sg12 to the checker processor 114 or not by asserting or negating a checker clock enable signal Sg32. Further, similarly to the control circuit 124, the control circuit 524 asserts a comparison enable signal Sg33 when the lock-step operation is performed, and negates the comparison enable signal Sg33 when the lock-step operation is not performed.

Figure 15:
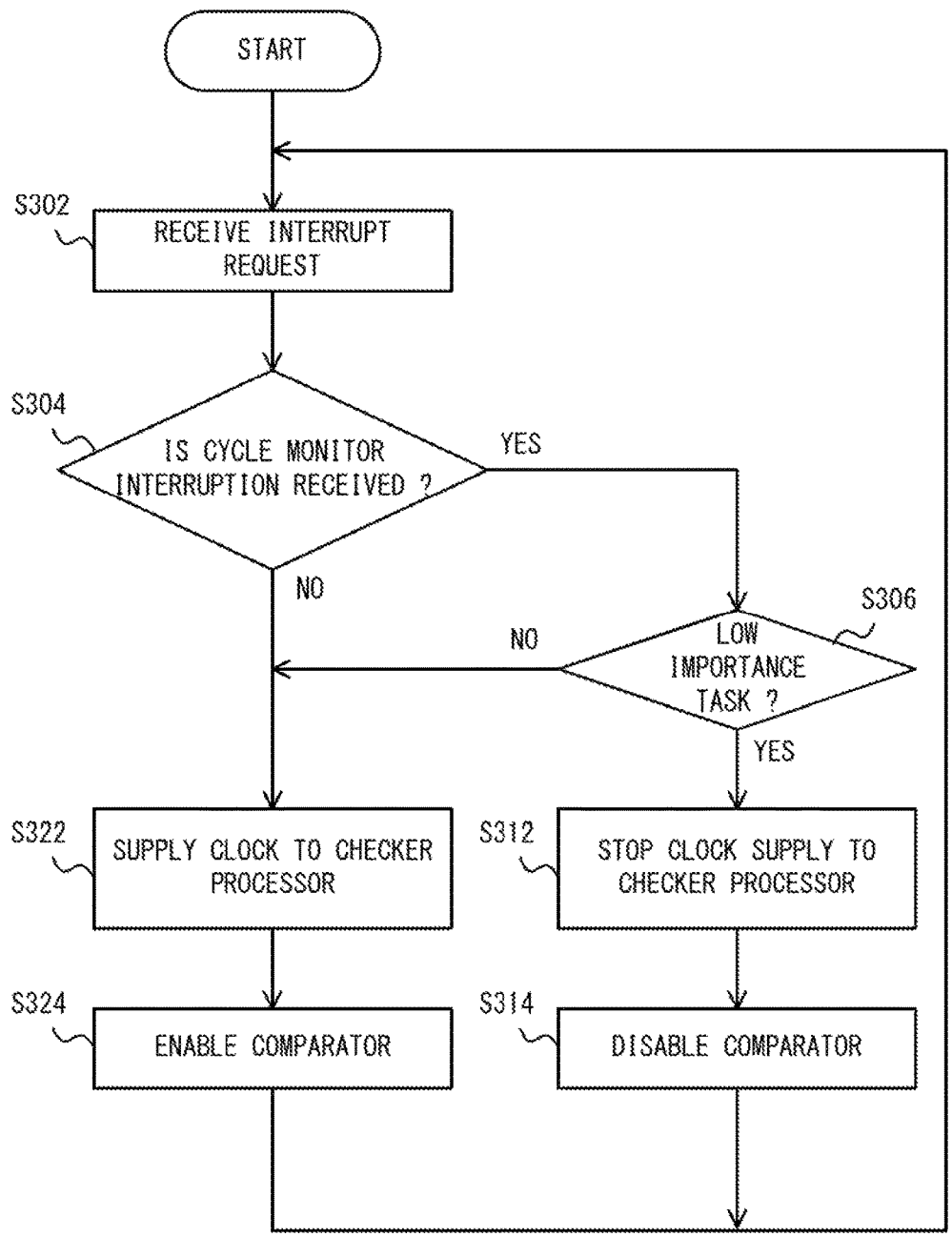
FIG. 15 is a flowchart showing processes performed by a control circuit according to the fifth embodiment.

FIG. 15 is a flowchart showing processes performed by the control circuit 524 according to the fifth embodiment. The control circuit 524 receives an interrupt request signal Sg30 from the interrupt controller 140 (S302). At this point, the control circuit 524 determines whether or not the control circuit 524 has received a cycle monitor interrupt request signal Sg51 (Sg51A, Sg51B) from the cycle monitor 570 (S304). When the control circuit 524 has not received a cycle monitor interrupt request signal Sg51 (No at S304), the frequency of the processing operations of high importance tasks is not high and hence the load on the processor unit 110 is not high. Therefore, the control circuit 524 supplies the clock to the checker processor 114 and thereby makes control so that a lock-step operation is performed (S322). Specifically, the control circuit 524 asserts the checker clock enable signal Sg32 and thereby makes the checker processor 114 operate. Further, the control circuit 524 asserts the comparison enable signal Sg33 and thereby enables the comparator 106 to operate (S324).

On the other hand, when the control circuit 524 has received a cycle monitor interrupt request signal Sg51 (Yes at S304), the frequency of the processing operations of high importance tasks is high and hence the load on the processor unit 110 is high. At this point, the control circuit 524 determines whether the interrupt request signal Sg30 received in the step S302 indicates a low importance or not (S306). When the interrupt request signal Sg30 does not indicate a low importance task (No at S306), the task to be processed is a high importance task. Therefore, the control circuit 524 performs control so that a lock-step operation is performed (S322 and S324).

On the other hand, when the interrupt request signal Sg30 indicates a low importance task (Yes at S306), the control circuit 524 stops the supply of the clock to the checker processor 114 and thereby prevents a lock-step operation from being performed (S312). Specifically, the control circuit 524 negates the checker clock enable signal Sg32 and thereby stops the checker processor 114. Further, the control circuit 524 negates the comparison enable signal Sg33 and thereby disables the comparator 106 from operating (S314).

Figure 16:
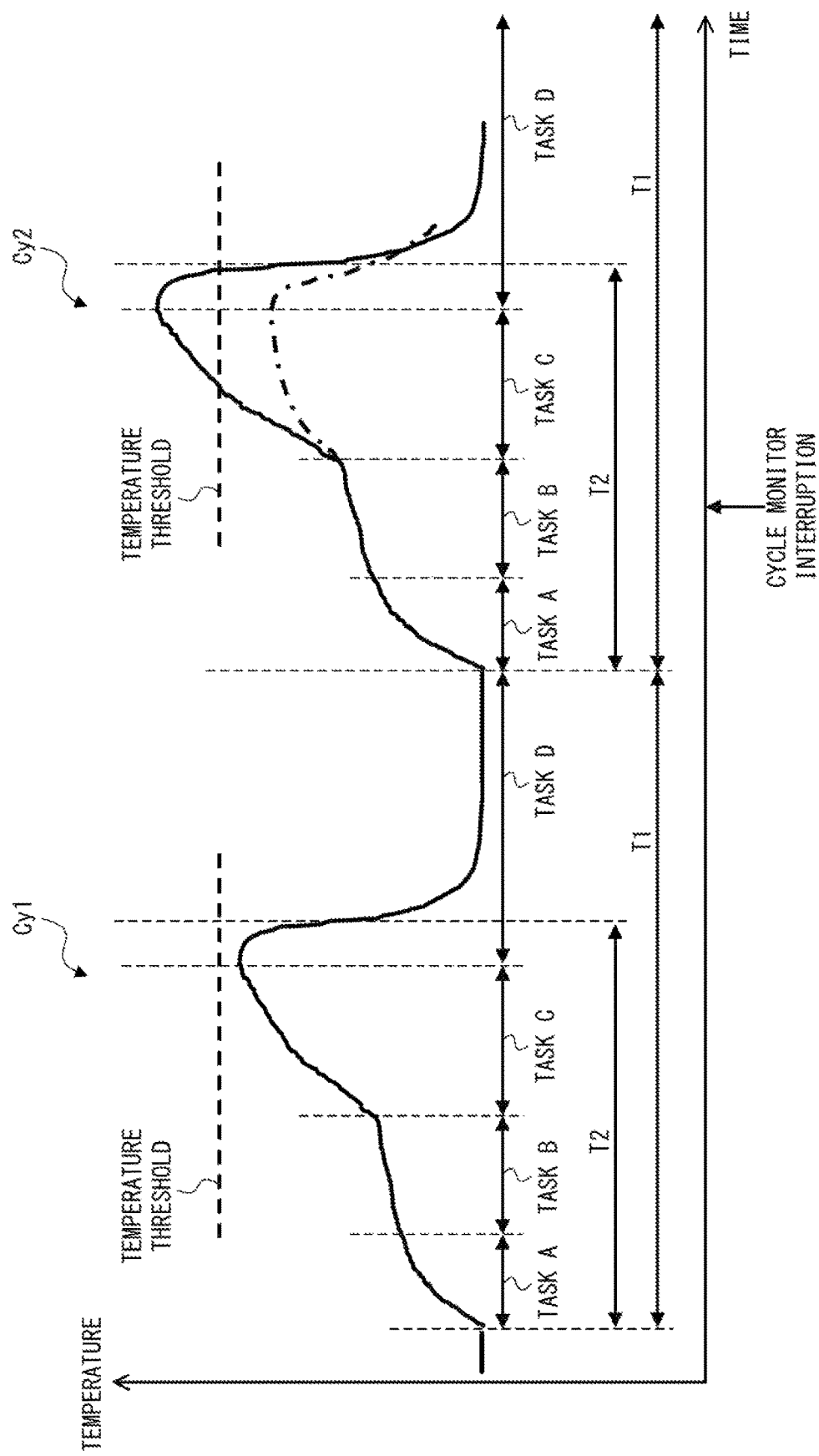
FIG. 16 is a graph showing an example of a relation between task processes and chip temperatures according to the fifth embodiment.

FIG. 16 is a graph showing an example of a relation between task processes and chip temperatures according to the fifth embodiment. In FIG. 16, the solid line indicates the temperature of the chip in the case where a lock-step operation is continuously performed for all the tasks (tasks A to D) (hereinafter referred to as "comparative example"). Further, the dashed-dotted line indicates the temperature of the chip of the processor system 500 according to the fifth embodiment.

Further, in FIG. 16, the tasks A, B and C are processed in this listed order. After that, the task D, which is an idling task, is processed. Note that the processing order of these tasks is not limited to the example shown in FIG. 16. This order changes according to the process of the interrupt controller 140. Further, in FIG. 16, a preceding cycle Cy1 and a subsequent cycle Cy2 are shown as an example. Note that in the example shown in FIG. 16, a cycle monitor interrupt request signal Sg51 is output from the cycle monitor 570 when a task B is being processed in the cycle Cy2.

As shown in FIG. 16 as an example, since the cycle monitor interrupt request signal Sg51 is not output in the cycle Cy1, it means that the load on the processor unit 110 is not high in the cycle Cy1. Therefore, the chip temperature is below or equal to a temperature threshold. In contrast to this, the cycle monitor interrupt request signal Sg51 is output in the cycle Cy2 when the task B is being processed. Therefore, the load on the processor unit 110 is high in the cycle Cy2.

In this state, the lock-step operation is continued in the comparative example (shown by solid line). Therefore, the chip temperature exceeds the temperature threshold when a task C is processed. In contrast to this, the processor system 500 according to the fifth embodiment is configured so as not to perform a lock-step operation in the above-described state where the task C, which is a low importance task, is processed in the cycle Cy2. That is, in the above-described state, the checker processor 114 does not process the low importance task (task C). As a result, the increase in the temperature due to the processing of the task C is roughly halved compared to the comparative example. Therefore, in the fifth embodiment, the chip temperature does not exceed the temperature threshold throughout the processing period of all the tasks. Therefore, the processor system 500 according to the fifth embodiment can reduce the heat generation amount.

Similarly to the third embodiment, in the fifth embodiment, when a high importance task is processed, a lock-step operation is always performed. Therefore, the processor system 500 according to the fifth embodiment can detect a fault within a predetermined period (PTPmax) while reducing the heat generation amount.

Note that in FIG. 14, as the cycle monitor 570, the cycle monitors 570A and 570B are separately provided. However, the cycle monitors 570A and 570B do not necessarily have to be provided as separate components. For example, one cycle monitor 570 may monitor the interruption frequency (interruption interval, interruption cycle) of the sensor input interrupt request signal Sg21 and that of the sensor input interrupt request signal Sg22. In this case, the cycle monitor 570 may separately monitor the interruption interval (interruption cycle) of the sensor input interrupt request signal Sg21 and that of the sensor input interrupt request signal Sg22 as in the case of the above-described fifth embodiment. Alternatively, the cycle monitor 570 may not differentiate between the sensor input interrupt request signals Sg21 and Sg22 and may collectively monitor the interruption interval (interruption cycle) of these interrupt request signals. That is, the cycle monitor 570 may monitor the collective frequency of the sensor input interrupt request signals Sg21 and Sg22. For example, when the sensor input interrupt request signal Sg21 is first input and then the sensor input interrupt request signal Sg22 is input, the cycle monitor 570 may count them as two interrupt request signals in total.

Note that although the cycle monitor 570 detects the interruption interval of high importance tasks (tasks A and B) in the above-described fifth embodiment, the tasks for which the interval is detected is not limited to the high importance tasks. The cycle monitor 570 may detect the interruption interval for some of low importance tasks that will increase the load on the processor unit 110 when they are frequently processed. Further, the cycle monitor 570 may monitor the interrupt request signal Sg30 and thereby detect the interruption interval of the interrupt request signal Sg30 indicating tasks for which a lock-step operation is performed (i.e., the tasks A and B). Note that as for the idling task (task D), its processing load on the processor unit is not high and do not substantially raise the chip temperature even when a lock-step operation is performed for it. Therefore, the cycle monitor 570 does not have to monitor the idling task (task D) (even if it is categorized as a high importance task).

Sixth Embodiment

Next, a sixth embodiment is explained. In the sixth embodiment, a lock-step operation is not performed for arbitrary tasks under normal conditions. However, when a time that has elapsed after a high importance task is processed becomes equal to or longer than a lock-step operation period (first period) equal to or shorter than the maximum proof test period (PTPmax), a high importance task is processed by a lock-step operation. In other words, in the sixth embodiment, a high importance task is not always processed by a lock-step operation, but is intermittently processed by a lock-step operation at such timings that the maximum proof test period (PTPmax) is satisfied. To put it differently, in the sixth embodiment, lock-step operations for high importance tasks are thinned out (i.e., some of high importance tasks are processed by a lock-step operation and others are not processed by a lock-step operation) while satisfying the maximum proof test period (PTPmax).

Figure 17:
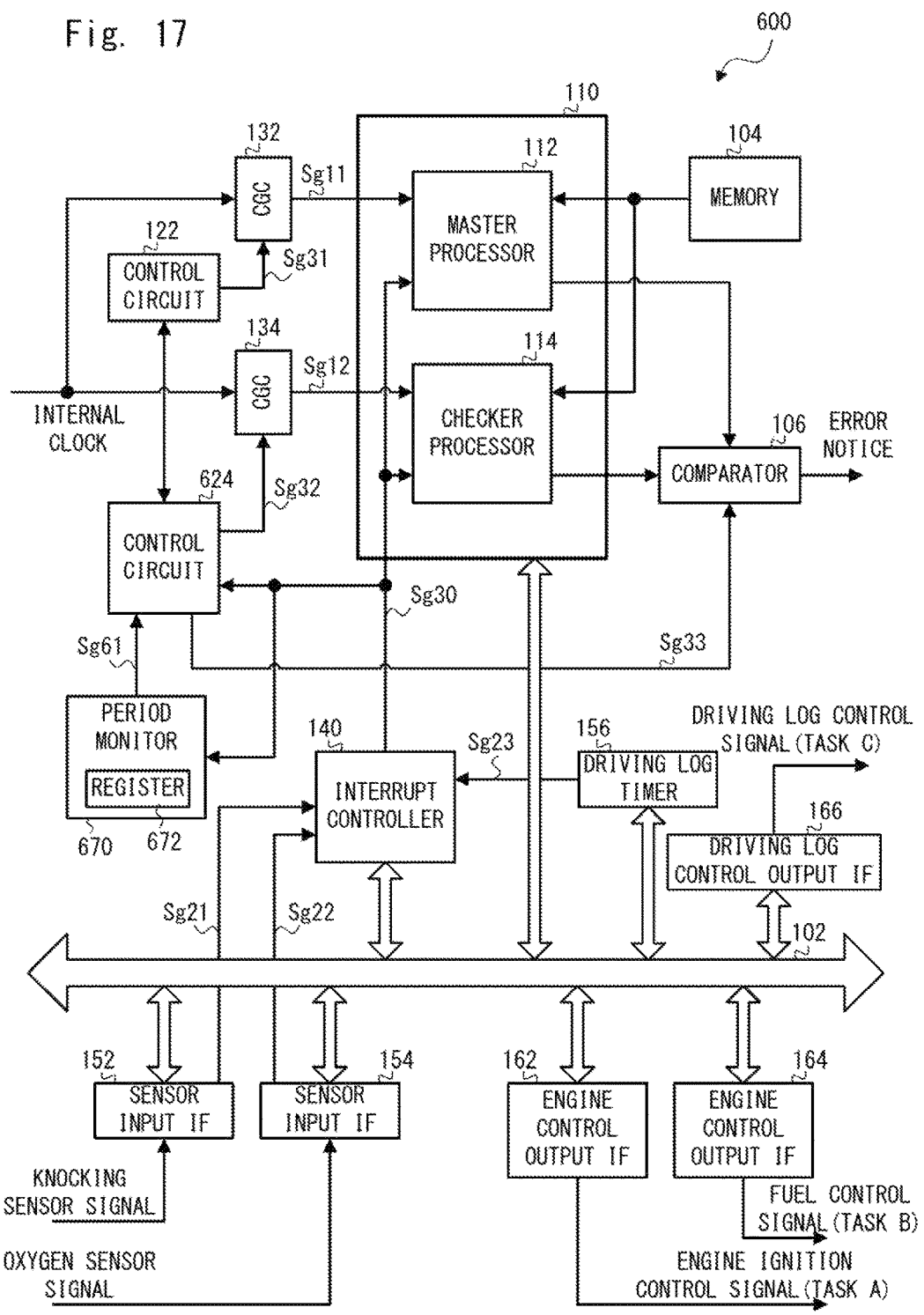
FIG. 17 shows a configuration of a processor system according to a sixth embodiment.

FIG. 17 shows a configuration of a processor system 600 according to the sixth embodiment. The processor system 600 according to the sixth embodiment has a configuration that is obtained by replacing the control circuit 324 by a control circuit 624 (control unit) in the processor system 300 according to the third embodiment. Further, the processor system 600 according to the sixth embodiment includes a period monitor 670. The configurations/components other than the above-described differences from the third embodiment in the processor system 600 according to the sixth embodiment are similar to those of the third embodiment.

The period monitor 670 counts (or measures) a time that has elapsed after a high importance task was processed by the previous lock-step operation. Then, when a lock-step operation period (first period) has elapsed after the high importance task was processed by the previous lock-step operation, the period monitor 670 outputs a period monitor interrupt request signal Sg61 to the control circuit 624. Note that the lock-step operation period, which is predetermined, is shorter than the PTPmax. Further, a setting value (lock-step operation period) shorter than the PTPmax is set in a register 672 provided in the period monitor 670.

Similarly to the control circuit 124, the control circuit 624 determines whether a lock-step operation should be performed or not according to an interrupt request signal Sg30 from the interrupt controller 140. Note that as described later, the control circuit 624 performs control so that a lock-step operation is performed for each lock-step operation period (i.e., at an interval equal to the lock-step operation period). Further, similarly to the control circuit 124, the control circuit 624 controls the CGC 134 as to whether the CGC 134 should supply a clock signal Sg12 to the checker processor 114 or not by asserting or negating a checker clock enable signal Sg32. Further, similarly to the control circuit 124, the control circuit 624 asserts a comparison enable signal Sg33 when the lock-step operation is performed, and negates the comparison enable signal Sg33 when the lock-step operation is not performed.

Figure 18:
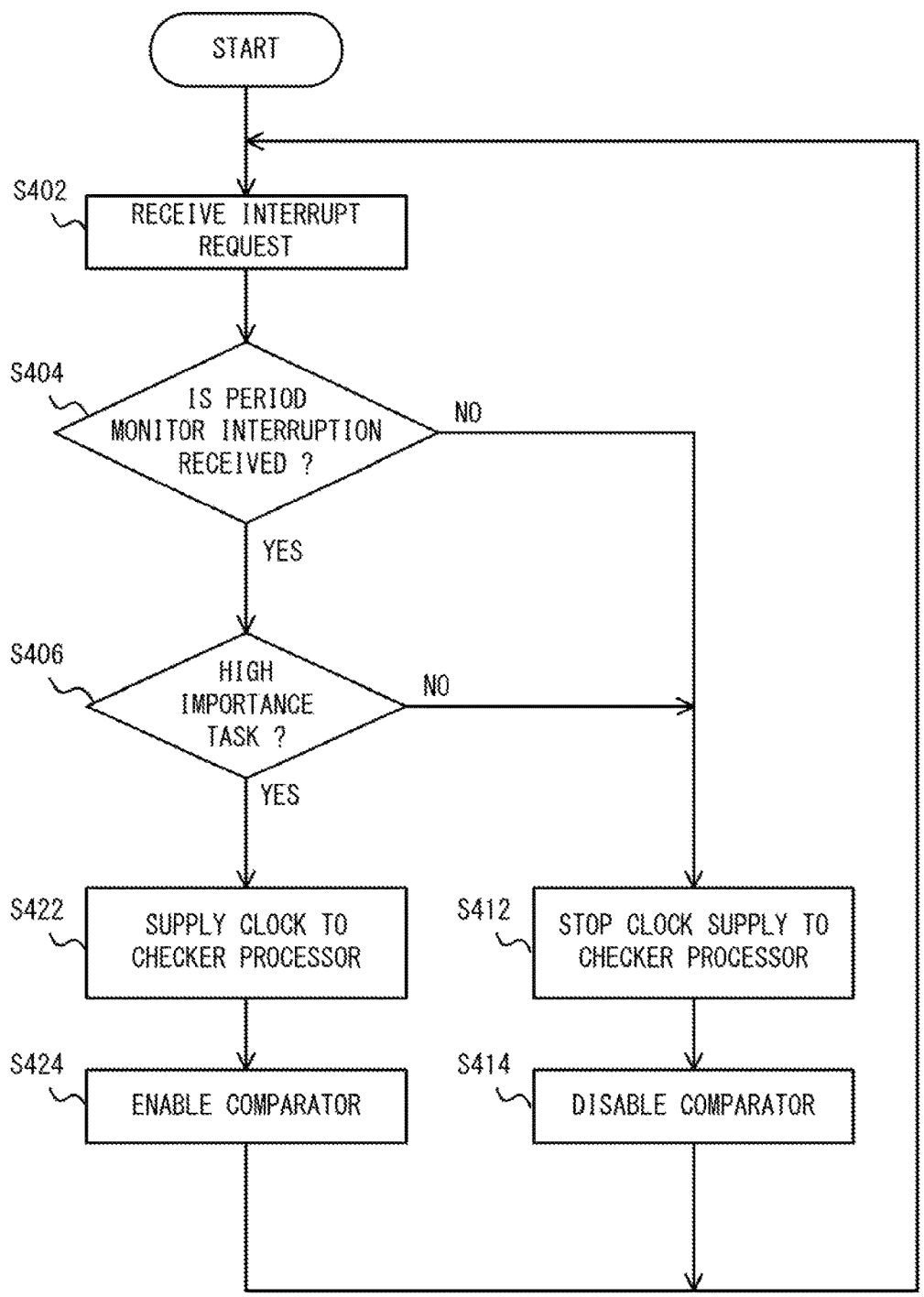
FIG. 18 is a flowchart showing processes performed by a control circuit according to the sixth embodiment.

FIG. 18 is a flowchart showing processes performed by the control circuit 624 according to the sixth embodiment. The control circuit 624 receives an interrupt request signal Sg30 from the interrupt controller 140 (S402). The control circuit 624 determines whether or not the control circuit 624 has received a period monitor interrupt request signal Sg61 from the period monitor 670 at this point (S404). When the control circuit 624 has not received a period monitor interrupt request signal Sg61 (No at S404), it means that a lock-step operation period has not yet elapsed. Therefore, the control circuit 624 stops the supply of the clock to the checker processor 114 and thereby prevents a lock-step operation from being performed (S412). Specifically, the control circuit 624 negates the checker clock enable signal Sg32 and thereby stops the checker processor 114. Further, the control circuit 624 negates the comparison enable signal Sg33 and thereby disables the comparator 106 from operating (S414).

On the other hand, when the control circuit 624 has received a period monitor interrupt request signal Sg61 (Yes at S404), it means that a lock-step operation period has elapsed. At this point, the control circuit 624 determines whether the interrupt request signal Sg30 received in the step S402 indicates a high importance or not (S406). When the interrupt request signal Sg30 does not indicate a high importance task (No at S406), the task to be processed is a low importance task. Therefore, the control circuit 624 performs control so that a lock-step operation is not performed (S412 and S414).

On the other hand, when the interrupt request signal Sg30 indicates a high importance task (Yes at S406), the control circuit 624 supplies the clock to the checker processor 114 and thereby makes control so that a lock-step operation is performed (S422). Specifically, the control circuit 624 asserts the checker clock enable signal Sg32 and thereby makes the checker processor 114 operate. Further, the control circuit 624 asserts the comparison enable signal Sg33 and thereby enables the comparator 106 to operate (S424). That is, the control circuit 624 makes the processor unit process an engine control task that occurs at a predetermined timing (i.e., a timing at which the lock-step operation period has elapsed) by a lock-step operation.

Figure 19:
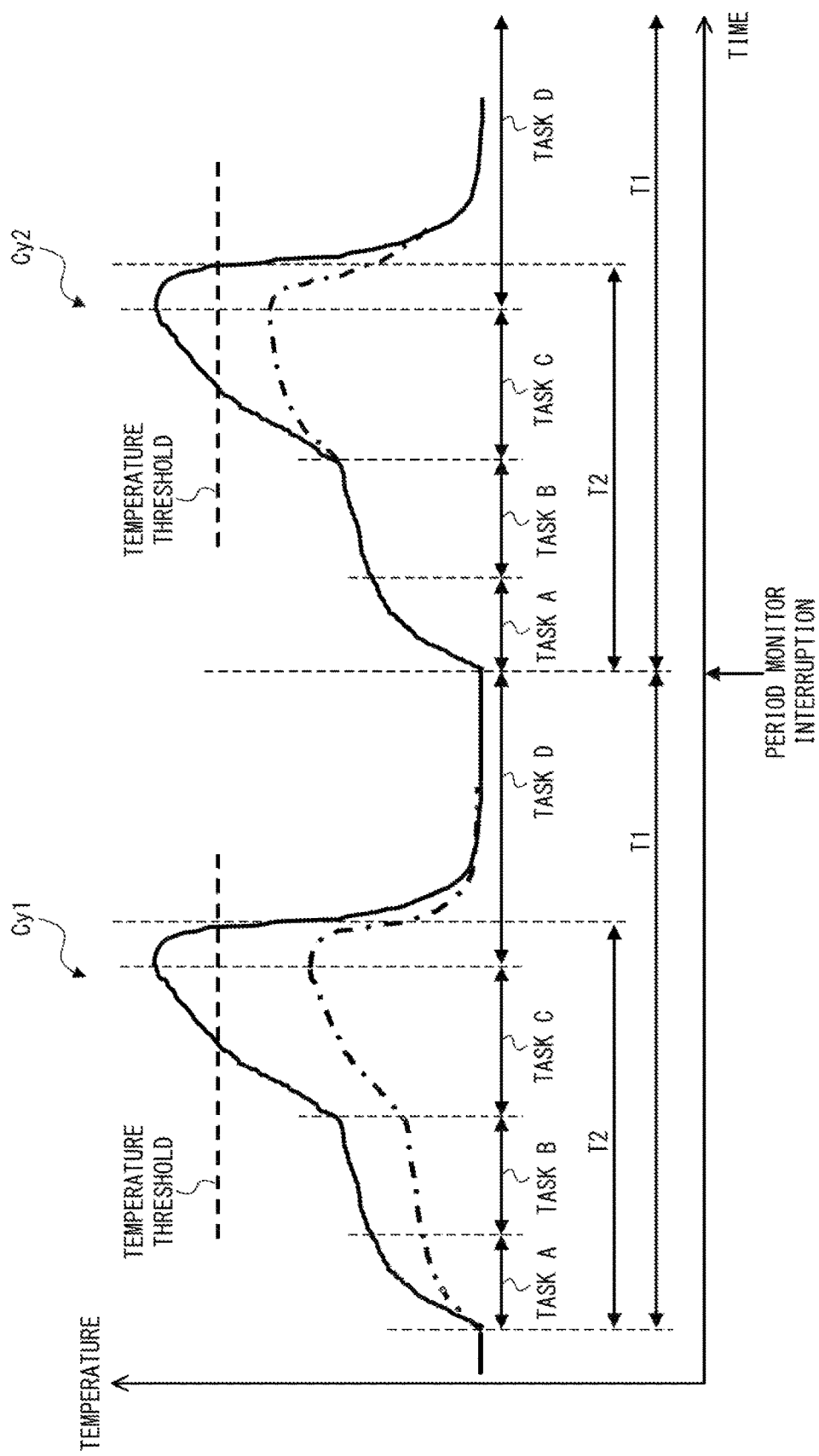
FIG. 19 is a graph showing an example of a relation between task processes and chip temperatures according to the sixth embodiment.

FIG. 19 is a graph showing an example of a relation between task processes and chip temperatures according to the sixth embodiment. In FIG. 19, the solid line indicates the temperature of the chip in the case where a lock-step operation is continuously performed for all the tasks (tasks A to D) (hereinafter referred to as "comparative example"). Further, the dashed-dotted line indicates the temperature of the chip of the processor system 600 according to the sixth embodiment.

Further, in FIG. 19, the tasks A, B and C are processed in this listed order. After that, the task D, which is an idling task, is processed. Note that the processing order of these tasks is not limited to the example shown in FIG. 19. This order changes according to the process of the interrupt controller 140. Further, in FIG. 19, a preceding cycle Cy1 and a subsequent cycle Cy2 are shown as an example. Note that in the example shown in FIG. 19, a period monitor interrupt request signal Sg61 is output from the period monitor 670 when a task A is being processed in the cycle Cy2.

As shown in FIG. 19 as an example, since the period monitor interrupt request signal Sg61 is not output in the cycle Cy1, it means that the lock-step operation period has not yet elapsed after the previous lock-step operation was performed in the cycle Cy1. Therefore, in the cycle Cy1, a lock-step operation is not performed not only for low importance tasks (task C) but also for high importance tasks (tasks A and B). That is, in the cycle Cy1, since the checker processor 114 does not operate, the increase in the chip temperature is reduced (or prevented). In contrast to this, in the comparative example, since a lock-step operation is performed when the tasks A to C are processed in the cycle Cy1, the chip temperature exceeds the temperature threshold. (The chip temperature also exceeds in the cycle Cy2.)

Meanwhile, in the sixth embodiment, a period monitor interrupt request signal Sg61 is output in the cycle Cy2. That is, a lock-step operation period has elapsed after the previous lock-step operation was performed. Therefore, when a lock-step operation is performed at this timing, the PTPmax can be satisfied. At this point, the tasks A and B, which are high importance tasks, are processed by interrupt handling. Therefore, a lock-step operation is performed when these tasks A and B are processed. Further, when the task C, which is a low importance task, is processed by interrupt handling, a lock-step operation is not performed and the checker processor 114 is stopped. Therefore, the chip temperature does not exceed the temperature threshold even in the cycle Cy2. Therefore, in the sixth embodiment, the chip temperature does not exceed the temperature threshold throughout the processing period of all the tasks. Therefore, the processor system 600 according to the sixth embodiment can reduce the heat generation amount.

Further, in the sixth embodiment, a lock-step operation for a high importance task is processed for each lock-step operation period (i.e., at an interval equal to the lock-step operation period). Further, this lock-step operation period is shorter than the PTPmax. That is, the period from when a lock-step operation is performed to when the next lock-step operation is performed is shorter than the PTPmax. As described above, a fault can be detected when a lock-step operation is performed. Therefore, the processor system 600 according to the sixth embodiment can detect a fault within a predetermined period (PTPmax). That is, the processor system 600 according to the sixth embodiment can detect a fault within a predetermined period (PTPmax) while reducing the heat generation amount.

Further, the sixth embodiment is configured so that a fault diagnosis is performed by processing a high importance task by a lock-step operation. Therefore, in contrast to the first embodiment, there is no need to perform a fault diagnosis task by interrupt handling. Note that if no high importance task is processed by interrupt handling even after the lock-step operation period has elapsed (i.e., only low importance tasks are processed by interrupt handling), a fault diagnosis task may be processed by interrupt handling as in the case of the first embodiment. That is, when no high importance task (engine control task) occurs at the predetermined timing (a timing at which the lock-step operation period has elapsed), a fault diagnosis task may be started. In this case, the control circuit 624 may process this fault diagnosis task by a lock-step operation. In this way, a fault diagnosis can be performed even when no engine control task occurs at the predetermined timing.

Note that the lock-step operation period is determined as appropriate according to the frequency with which high importance tasks are processed by interrupt handling. For example, when the frequency with which high importance tasks are processed by interrupt handling is high, the possibility that a high importance task is processed by interrupt handling within a period from when a lock-step operation period has elapsed to when the maximum proof test period (PTPmax) has elapsed is very high even when the lock-step operation period is increased to a value close to the PTPmax. Therefore, in this case, it is possible to perform a lock-step operation so that the PTPmax is satisfied. On the other hand, when the frequency with which high importance tasks are processed by interrupt handling is low, the possibility that a high importance task is processed by interrupt handling within a period from when a lock-step operation period has elapsed to when the maximum proof test period (PTPmax) has elapsed is low. Therefore, it is desirable to shorten the lock-step operation period when the frequency with which high importance tasks are processed by interrupt handling is low.

The sixth embodiment is especially effective when low importance tasks are rarely processed by interrupt handling and high importance tasks are processed by interrupt handling very frequently and when the PTPmax is very long compared to one cycle of the engine control. When high importance tasks are processed by interrupt handling very frequently, the lock-step operation period can be increased as described above. In such cases, since periods in which no lock-step operation is performed increase, the increase in the chip temperature can be reduced. Further, when the PTPmax is very long compared to one cycle of the engine control, a number of cycles can be included in a period corresponding to the PTPmax. In such cases, since the number of cycles in which no lock-step operation is performed increases, the increase in the chip temperature can be reduced.

Note that in the above-described embodiment, the period monitor 670 counts (or measures) a time that has elapsed after a high importance task was processed in the previous lock-step operation. However, the counting method is not limited to such configurations. For example, the period monitor 670 may count (or measure) a time in which high importance tasks are processed by interrupt handling. In this case, the period monitor 670 may output a period monitor interrupt request signal Sg61 to the control circuit 624 when the total time in which high importance tasks are processed reaches a lock-step operation period (first period). Further, the period monitor 670 does not necessarily have to be provided as a separate component. That is, the control circuit 624 may perform the function of the period monitor 670 in addition to its original functions.

Modified Examples

Note that the present invention is not limited to the above-described embodiments, and they can be modified as desired without departing from the spirit and scope of the present invention. For example, some of the above-described components may be formed as one integrated component as appropriate. Further, a plurality of functions of one component may be performed by separate components as appropriate. Further, in the above-described embodiments, when the state of the processor unit is changed from a state where a lock-step operation is not performed to a state where a lock-step operation is performed, processed data in the master processor 112 may be copied to the checker processor 114.

Further, the above-described embodiments may be combined with one another and applied in a combined state. For example, the first embodiment may be combined with the sixth embodiment. That is, when a high importance task is scheduled to be processed by interrupt handling at an interrupt timing of a fault diagnosis task in the first embodiment, the high importance task may be processed instead of processing the fault diagnosis task and a lock-step operation may be performed for that high importance task as the sixth embodiment. Further, the first embodiment may be combined with the fourth embodiment and may be configured so that the occurrence of the interruption for a fault diagnosis task is determined by using a fetch address.

Further, in the above-described embodiments, the checker processor 114 is operated by supplying a clock to the checker processor 114 and stopped by stopping the supply of the clock. However, the operating method of the checker processor 114 is not limited to such configurations. That is, the clock does not necessarily have to be used to change the operating state of the checker processor 114. For example, the processor unit may be configured so that the master processor 112 and the checker processor 114 are separately supplied with their electric power. In this case, when a lock-step operation is performed, the checker processor 114 may be powered on. Further, when a lock-step operation is not performed, the checker processor 114 may be powered off.

Further, in the above-described embodiment, identification information of a task that should be processed by interrupt handling is contained in the interrupt request signal Sg30 supplied from the interrupt controller 140. However, the present invention is not limited to such configurations. For example, a plurality of interruption lines each of which corresponds to a respective one of the tasks (e.g., the tasks A to E) may be provided between the interrupt controller 140 and the processor unit 110. In this case, when a signal on one of the interruption lines is asserted, the processor unit 110 may read a task corresponding to that interruption line from the memory 104. Further, in the above-described embodiment, the control circuit is provided as a separate component from the interrupt controller 140. However, the control circuit and the interrupt controller 140 may be formed as one integrated component.

The present invention made by the inventors has been explained above in a specific manner based on embodiments. However, the present invention is not limited to the above-described embodiments, and needless to say, various modifications can be made without departing from the spirit and scope of the present invention. The first to sixth embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A processor system comprising:
   a master processor that successively processes a plurality of tasks;
   a checker processor that successively processes at least one of the plurality of tasks; and
   a control circuit that performs control so that the checker processor operates when the master processor and the checker processor perform a lock-step operation, and the checker processor stops its operation when the master processor and the checker processor do not perform the lock-step operation, the lock-step operation being an operation in which each of the master processor and the checker processor processes the same task,
   wherein the control circuit performs control so that a period from when a task is processed by the lock-step operation to when another task is processed in the next lock-step operation is equal to or shorter than a maximum test period that is predetermined, the maximum test period being a test period acceptable to the processor system,
   wherein the maximum test period is defined by subtracting a sum of a fault reaction time and a time necessary for a test process, from a fault tolerant time interval,
   wherein the fault reaction time is a period from when a fault is detected to when the processor system changes to a stopped state, and
   wherein the fault tolerant time interval is a period from when the fault occurs in the processor system to when the processor system changes to the stopped state.

2. The processor system according to claim 1, wherein
   at least one fault diagnosis task is processed by interrupt handling at an interval equal to or shorter than the maximum test period, and
   the control circuit performs control so that the lock-step operation is performed when the fault diagnosis task is processed by interrupt handling.

3. The processor system according to claim 2, wherein the control circuit performs control so that the lock-step operation is not performed when the fault diagnosis task is not processed by interrupt handling.

4. The processor system according to claim 2, wherein
a plurality of fault diagnosis tasks are processed by interrupt handling, and
a first fault diagnosis task among the plurality of fault diagnosis tasks is a task for performing a fault diagnosis for a first area of the master processor, and a second fault diagnosis task among the plurality of fault diagnosis tasks is a task for performing a fault diagnosis for a second area of the master processor.

5. The processor system according to claim 1, wherein
a first task and a second task different from the first task are processed by interrupt handling, the first task being a task for which if a fault occurs during its execution, that fault needs to be detected, and
the control circuit makes control so that the lock-step operation is performed when the first task is processed by interrupt handling.

6. The processor system according to claim 5, wherein the control circuit makes control so that the lock-step operation is performed when a fetch address in the master processor matches an address of the first task in a memory, the memory storing the plurality of tasks.

7. The processor system according to claim 1, wherein
a first task and a second task different from the first task are processed by interrupt handling and processed by the lock-step operation, the first task being a task for which if a fault occurs during its execution, that fault needs to be detected, and
the control circuit makes control so that the lock-step operation for the second task is not performed according to a frequency with which the processor system processes at least the first task.

8. The processor system according to claim 5, wherein when a period that has elapsed after the first task is processed by the lock-step operation becomes equal to or longer than a first period shorter than the maximum test period, and when a second processing of the first task by interrupt handling is requested, the control circuit performs control so that the first task is processed again by the lock-step operation.

9. A control method comprising:
performing control so that a checker processor is operated when a lock-step operation is performed, the lock-step operation being an operation in which a master processor and the checker processor each process the same task, the master processor being configured to successively process a plurality of tasks, the checker processor being configured to successively process at least one of the plurality of tasks;
performing control so that the checker processor is stopped when the lock-step operation is not performed; and
performing control so that a period from when a task is processed in the lock-step operation to when another task is processed in the next lock-step operation is equal to or shorter than a maximum test period that is predetermined, the maximum test period being a test period acceptable to a system,
wherein the maximum test period is defined by subtracting a sum of a fault reaction time and a time necessary for a test process, from a fault tolerant time interval,
wherein the fault reaction time is a period from when a fault is detected to when a system including the checker and master processors changes to a stopped state, and
wherein the fault tolerant time interval is a period from when the fault occurs to when the system changes to the stopped state.

10. The control method according to claim 9, wherein
at least one fault diagnosis task is processed by interrupt handling at an interval equal to or shorter than the maximum test period, and
control is performed so that the lock-step operation is performed when the fault diagnosis task is processed by interrupt handling.

11. The control method according to claim 10, wherein control is performed so that the lock-step operation is not performed when the fault diagnosis task is not processed by interrupt handling.

12. The control method according to claim 10, wherein
a plurality of fault diagnosis tasks are processed by interrupt handling,
when a first fault diagnosis task among the plurality of fault diagnosis tasks is processed by interrupt handling, a fault diagnosis for a first area of the master processor is performed, and
when a second fault diagnosis task among the plurality of fault diagnosis tasks is processed by interrupt handling, a fault diagnosis for a second area of the master processor is performed.

13. The control method according to claim 9, wherein
a first task and a second task different from the first task are processed by interrupt handling, the first task being a task for which if a fault occurs during its execution, that fault needs to be detected, and
control is performed so that the lock-step operation is performed when the first task is processed by interrupt handling.

14. The control method according to claim 13, wherein control is performed so that the lock-step operation is performed when a fetch address in the master processor matches an address of the first task in a memory, the memory storing the plurality of tasks.

15. The control method according to claim 9, wherein
a first task and a second task different from the first task are processed by interrupt handling, the first task being a task for which if a fault occurs during its execution, that fault needs to be detected,
control is performed so that the first and second tasks are processed by the lock-step operation, and
control is performed so that the lock-step operation for the second task is not performed according to a frequency with which at least the first task is processed.

16. The control method according to claim 13, wherein when a period that has elapsed after the first task is processed by the lock-step operation becomes equal to or longer than a first period shorter than the maximum test period, and when a second processing of the first task by interrupt handling is requested, control is performed so that the first task is processed again by the lock-step operation.

17. A non-transitory computer readable medium storing a program for causing a computer to execute:
a step of performing control so that a checker processor is operated when a lock-step operation is performed, the lock-step operation being an operation in which a master processor and the checker processor each process the same task, the master processor being configured to successively process a plurality of tasks, the checker processor being configured to successively process at least one of the plurality of tasks;

a step of performing control so that the checker processor is stopped when the lock-step operation is not performed; and a step of performing control so that a period from when a task is processed in the lock-step operation to when another task is processed in the next lock-step operation is equal to or shorter than a maximum test period that is predetermined, the maximum test period being a test period acceptable to a system, wherein the maximum test period is defined by subtracting a sum of a fault reaction time and a time necessary for a test process, from a fault tolerant time interval, wherein the fault reaction time is a period from when a fault is detected to when a system including the checker and master processors changes to a stopped state, and wherein the fault tolerant time interval is a period from when the fault occurs to when the system changes to the stopped state.

18. An engine control system comprising:

first and second processors each of which is capable of processing a plurality of tasks including an engine control task by a lock-step method; and a control unit that enables or disables the lock-step method, wherein the control unit enables the lock-step method at a predetermined timing so that an interval between a first lock-step process and a second lock-step process subsequent to the first lock-step process is equal to or shorter than a maximum test period, the maximum test period being a test period acceptable to a system, wherein the maximum test period is defined by subtracting a sum of a fault reaction time and a time necessary for a test process, from a fault tolerant time interval, wherein the fault reaction time is a period from when a fault is detected to when the engine control system changes to a stopped state, and wherein the fault tolerant time interval is a period from when the fault occurs to when the engine control system changes to the stopped state.

19. The engine control system according to claim 18, wherein the control unit makes the processors process the engine control task that occurs at the predetermined timing by the lock-step method.

20. The engine control system according to claim 19, wherein when the engine control task does not occur at the predetermined timing, a fault diagnosis task is started and the control unit makes the processors process the fault diagnosis task by the lock-step method.

21. The engine control system according to claim 18, wherein a fault diagnosis task is started at the predetermined timing and the control unit makes the processors process the fault diagnosis task by the lock-step method.

22. The engine control system according to claim 18, further comprising a sensor input interface, wherein the engine control task is started according to an input signal supplied from the sensor input interface.

23. The engine control system according to claim 22, wherein the control unit disables the lock-step method for a task other than the engine control task.

\* \* \* \* \*